(12) United States Patent
Savchenkov et al.

(10) Patent No.: US 8,164,816 B1
(45) Date of Patent: Apr. 24, 2012

(54) STABILIZING OPTICAL RESONATORS

(75) Inventors: Anatoliy Savchenkov, Glendale, CA (US); Andrey B. Matsko, Pasadena, CA (US); Nan Yu, Arcadia, CA (US); Lutfollah Maleki, Pasadena, CA (US); Vladimir Ilchenko, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 903 days.

(21) Appl. No.: 12/203,143

(22) Filed: Sep. 2, 2008

Related U.S. Application Data

(60) Provisional application No. 60/967,089, filed on Aug. 31, 2007.

(51) Int. Cl.
*G02F 1/03* (2006.01)

(52) U.S. Cl. .......................................... 359/245

(58) Field of Classification Search .................. 359/245, 359/246, 254, 255, 256, 239, 322, 323; 385/2, 385/3, 8; 372/12, 26, 27, 28
See application file for complete search history.

(56) References Cited

U.S. PATENT DOCUMENTS

| | | | |
|---|---|---|---|
| 5,204,640 A | 4/1993 | Logan, Jr. |
| 5,220,292 A | 6/1993 | Bianchini et al. |
| 5,723,856 A | 3/1998 | Yao et al. |
| 5,751,747 A | 5/1998 | Lutes et al. |
| 5,777,778 A | 7/1998 | Yao |
| 5,917,179 A | 6/1999 | Yao |
| 5,929,430 A | 7/1999 | Yao et al. |
| 5,985,166 A | 11/1999 | Unger et al. |
| 6,080,586 A | 6/2000 | Baldeschwieler et al. |
| 6,178,036 B1 | 1/2001 | Yao |
| 6,203,660 B1 | 3/2001 | Unger et al. |
| 6,389,197 B1 | 5/2002 | Iltchenko et al. |
| 6,417,957 B1 | 7/2002 | Yao |
| 6,473,218 B1 | 10/2002 | Maleki et al. |
| 6,476,959 B2 | 11/2002 | Yao |
| 6,487,233 B2 | 11/2002 | Maleki et al. |
| 6,488,861 B2 | 12/2002 | Iltchenko et al. |
| 6,490,039 B2 | 12/2002 | Maleki et al. |
| 6,535,328 B2 | 3/2003 | Yao |
| 6,567,436 B1 | 5/2003 | Yao et al. |
| 6,580,532 B1 | 6/2003 | Yao et al. |
| 6,594,061 B2 | 7/2003 | Huang et al. |
| 6,762,869 B2 | 7/2004 | Maleki et al. |
| 6,795,481 B2 | 9/2004 | Maleki et al. |
| 6,798,947 B2 | 9/2004 | Iltchenko |
| 6,853,479 B1 | 2/2005 | Ilchenko et al. |
| 6,871,025 B2 | 3/2005 | Maleki et al. |
| 6,873,631 B2 | 3/2005 | Yao et al. |

(Continued)

FOREIGN PATENT DOCUMENTS

WO 01/96936 12/2001

(Continued)

OTHER PUBLICATIONS

Braginsky, V.B., et al., "Quality-Factor and Nonlinear Properties of Optical Whispering-Gallery Modes," *Physics Letters* A, 137(7, 8):393-397, May 1989.

(Continued)

*Primary Examiner* — Ricky Mack
*Assistant Examiner* — Tuyen Tra
(74) *Attorney, Agent, or Firm* — Perkins Coie LLP

(57) ABSTRACT

Techniques and devices that stabilize optical resonators.

14 Claims, 13 Drawing Sheets

U.S. PATENT DOCUMENTS

| | | | |
|---|---|---|---|
| 6,879,752 B1 | 4/2005 | Ilchenko et al. | |
| 6,901,189 B1 | 5/2005 | Savchenkov et al. | |
| 6,906,309 B2 | 6/2005 | Sayyah et al. | |
| 6,922,497 B1 | 7/2005 | Savchenkov et al. | |
| 6,928,091 B1 | 8/2005 | Maleki et al. | |
| 6,943,934 B1 | 9/2005 | Ilchenko et al. | |
| 6,987,914 B2 | 1/2006 | Savchenkov et al. | |
| 7,024,069 B2 | 4/2006 | Savchenkov et al. | |
| 7,043,117 B2 | 5/2006 | Matsko et al. | |
| 7,050,212 B2 | 5/2006 | Matsko et al. | |
| 7,061,335 B2 | 6/2006 | Maleki et al. | |
| 7,062,131 B2 | 6/2006 | Ilchenko | |
| 7,092,591 B2 | 8/2006 | Savchenkov et al. | |
| 7,133,180 B2 | 11/2006 | Ilchenko et al. | |
| 7,173,749 B2 | 2/2007 | Maleki et al. | |
| 7,184,451 B2 | 2/2007 | Ilchenko et al. | |
| 7,187,870 B2 | 3/2007 | Ilchenko et al. | |
| 7,218,662 B1 | 5/2007 | Ilchenko et al. | |
| 7,248,763 B1 | 7/2007 | Kossakovski et al. | |
| 7,260,279 B2 | 8/2007 | Gunn et al. | |
| 7,283,707 B1 | 10/2007 | Maleki et al. | |
| 7,356,214 B2 * | 4/2008 | Ilchenko | 385/15 |
| 7,369,722 B2 | 5/2008 | Yilmaz et al. | |
| 7,389,053 B1 | 6/2008 | Ilchenko et al. | |
| 7,400,796 B1 | 7/2008 | Kossakovski et al. | |
| 7,440,651 B1 | 10/2008 | Savchenkov et al. | |
| 7,460,746 B2 | 12/2008 | Maleki et al. | |
| 7,801,189 B2 * | 9/2010 | Maleki et al. | 372/26 |
| 2001/0038651 A1 | 11/2001 | Maleki et al. | |
| 2002/0018611 A1 | 2/2002 | Maleki et al. | |
| 2002/0018617 A1 | 2/2002 | Iltchenko et al. | |
| 2002/0021765 A1 | 2/2002 | Maleki et al. | |
| 2002/0081055 A1 | 6/2002 | Painter et al. | |
| 2002/0085266 A1 | 7/2002 | Yao | |
| 2002/0097401 A1 | 7/2002 | Maleki et al. | |
| 2003/0160148 A1 | 8/2003 | Yao et al. | |
| 2004/0100675 A1 | 5/2004 | Matsko et al. | |
| 2004/0109217 A1 | 6/2004 | Maleki et al. | |
| 2004/0218880 A1 | 11/2004 | Matsko et al. | |
| 2004/0240781 A1 | 12/2004 | Savchenkov et al. | |
| 2005/0017816 A1 | 1/2005 | Ilchenko et al. | |
| 2005/0063034 A1 | 3/2005 | Maleki et al. | |
| 2005/0074200 A1 | 4/2005 | Savchenkov et al. | |
| 2005/0123306 A1 | 6/2005 | Ilchenko et al. | |
| 2005/0128566 A1 | 6/2005 | Savchenkov et al. | |
| 2005/0175358 A1 | 8/2005 | Ilchenko et al. | |
| 2005/0248823 A1 | 11/2005 | Maleki et al. | |
| 2007/0009205 A1 | 1/2007 | Maleki et al. | |
| 2007/0153289 A1 | 7/2007 | Yilmaz et al. | |
| 2008/0001062 A1 | 1/2008 | Gunn et al. | |
| 2008/0075464 A1 | 3/2008 | Maleki et al. | |
| 2008/0310463 A1 | 12/2008 | Maleki et al. | |

FOREIGN PATENT DOCUMENTS

| | | |
|---|---|---|
| WO | 2005/038513 | 4/2005 |
| WO | 2005/055412 | 6/2005 |
| WO | 2005/067690 | 7/2005 |
| WO | 2005/122346 | 12/2005 |
| WO | 2006/076585 | 7/2006 |
| WO | 2007/143627 | 12/2007 |

OTHER PUBLICATIONS

Eliyahu, D., et al., "Low Phase Noise and Spurious Levels in Multi-Loop Opto-Electronic Oscillators," *Proceedings of the 2003 IEEE International Frequency Control Sympsoium and PDA Exhibition*, pp. 405-410, May 2003.

Eliyahu, D., et al., "Modulation Response ($S_{21}$) of the Coupled Opto-Electronic Oscillator," *Proceedings of the 2005 IEEE International Frequency Control Symposium and Exposition*, pp. 850-856, Aug. 2005.

Eliyahu, D., et al., "Tunable, Ultra-Low Phase Noise YIG Based Opto-Electronic Oscillator," *IEEE MTT-S International Microwave Symposium Digest*, 3:2185-2187, Jun. 2003.

Gorodetsky, M.L., et al., "Optical Microsphere Resonators: Optimal Coupling to High-$Q$ Whispering-Gallery Modes," *J.Opt. Soc. Am. B*, 16(1):147-154, Jan. 1999.

Gorodetsky, M.L., et al., "Rayleigh Scattering in High-$Q$ Microspheres," *J. Opt. Soc. Am. B*, 17(6):1051-1057, Jun. 2000.

Gorodetsky, M.L., et al., "Ultimate $Q$ of Optical Microsphere Resonators," *Optics Letters*, 21(7):453-455, Apr. 1996.

Hryniewicz, J.V., et al., "Higher Order Filter Response in Coupled Microring Resonators," *IEEE Photonics Technology Letters*, 12(3):320-322, Mar. 2000.

Huang, S., et al., "A 'Turnkey' Optoelectronic Oscillator with Low Acceleration Sensitivity," *2000 IEEE/EIA International Frequency Control Symposium and Exhibition*, pp. 269-279, Jun. 2000.

Ilchenko, V., et al., "Electrooptically Tunable Photonic Microresonators and Photonic Bandgap Waveguide Coupling for Micro-Optoelectronic Oscillators," *GOMACTech 2003*, Tampa, Florida, pp. 1-4.

Ilchenko, V., et al., "High-Q Microsphere Cavity for Laser Stabilization and Optoelectronic Microwave Oscillator," *Proceedings SPIE Microresonators and Whispering-Gallery Modes*, vol. 3611, pp. 190-198, Jan. 1999.

Ilchenko, V., et al., "Microsphere Integration in Active and Passive Photonics Devices," *Proc. Of SPIE Laser Resonators III*, vol. 3930, pp. 154-162, Jan. 2000.

Ilchenko, V., et al., "Microtorus: A High-Finesse Microcavity with Whispering-Gallery Modes," *Optics Letters*, 26(5):256-258, Mar. 2001.

Ilchenko, V., et al., "Pigtailing the High-$Q$ Microsphere Cavity: A Simple Fiber Coupler for Optical Whispering-Gallery Modes," *Optics Letters*, 24(11):723-725, Jun. 1999.

Ilchenko, V., et al., "Sub-Micro Watt Photonic Microwave Receiver," *IEEE Photonics Technology Letters*, 14(11):1602-1604, Nov. 2002.

Ilchenko, V., et al., "Tunability and Synthetic Lineshapes in High-Q Optical Whispering Gallery Modes," *Proc. Of SPIE Laser Resonators and Beam Control VI*, vol. 4969, pp. 195-206, Jan. 2003.

Ilchenko, V., et al., "Whispering-Gallery-Mode Electro-Optic Modulator and Photonic Microwave Receiver," *J. Opt. Soc. Am. B*, 20(2):333-342, Feb. 2003.

Ito, H., et al., "InP/InGaAs Uni-Travelling-Carrier Photodiode with 310 GHz Bandwidth," *Electronics Letters*, 36(21):1809-1810, Oct. 2000.

Logan, R., et al., "Stabilization of Oscillator Phase Using a Fiber-Optic Delay-Line," *IEEE 45th Annual Symposium on Frequency Control*, pp. 508-512, May 1991.

Maleki, L., "The Opto-Electronic Oscillator: Prospects for Extending the State of the Art in Reference Frequency Generation," *International Topical Meeting on Microwave Photonics*, pp. 195-198, Oct. 1998.

Matsko, A., et al., "Active Mode Locking with Whispering-Gallery Modes," *J. Opt. Soc. Am. B*, 20(11):2292-2296, Nov. 2003.

Matsko, A., et al., "The Maximum Group Delay in a Resonator : an Unconventional Approach," *Proceedings of SPIE—The International Society for Optical Engineering*, vol. 6452, pp. 64520P.1-64520P.9, Feb. 2007.

Matsko, A., et al., "Whispering-Gallery-Mode based Optoelectronic Microwave Oscillator," *Journal of Modern Optics*, 50(15-17):2523-2542, Feb. 2004.

Matsko, A., et al., "Whispering-Gallery-Mode Resonators as Frequency References. I. Fundamental Limitations," *J. Opt. Soc. Am. B*, 24(6):1324-1335, Jun. 2007.

Myers, L.E., et al., "Quasi-Phase-Matched Optical Parametric Oscillators in Bulk Periodically Poled $LiNbO_3$," *J. Opt. Soc. Am. B*, 12(11):2102-2116, Nov. 1995.

Savchenkov, A., et al., "Optical Resonators With Ten Million Finesse," *Optics Express*, 15(11):6768-6773, May 2007.

Savchenkov, A., et al., "Whispering-Gallery-Mode Resonators as Frequency References. II. Stabilization," *J. Opt. Soc. Am. B*, 24(12):2988-2997, Dec. 2007.

Vassiliev, V.V., et al., "Narrow-Line-Width Diode Laser with a High-$Q$ Microsphere Resonator," *Optics Communications*, 158(1-6):305-312, Dec. 1998.

Yao, X.S., et al., "A Novel Photonic Oscillator," *Digest of the LEOS Summer Topical Meetings*, pp. 17-18, Aug. 1995.

Yao, X.S., et al., "A Novel Photonic Oscillator," *TDA Progress Report 42-122*, pp. 32-43, Aug. 1995.

Yao, X.S., et al., "Converting Light into Spectrally Pure Microwave Oscillation," *Optics Letters*, 21(7):483-485, Apr. 1996.

Yao, X.S., et al., "Coupled Optoelectronic Oscillators for Generating Both RF Signal and Optical Pulses," *Journal of Lightwave Tecnhology*, 18(1):73-78, Jan. 2000.

Yao, X.S., et al., "Dual Microwave and Optical Oscillator," *Optics Letters*, 22(24):1867-1869, Dec. 1997.

Yao, X.S., et al., "Multiloop Optoelectronic Oscillator," *IEEE Journal of Quantum Electronics*, 36(1):79-84, Jan. 2000.

Yao, X.S., et al., "Optoelectronic Microwave Oscillator," *J. Opt. Soc. Am. B*, 13(8):1725-1735, Aug. 1996.

Yao, X.S., et al., "Optoelectronic Oscillator for Photonic Systems," *IEEE Journal of Quantum Electronics*, 32(7):1141-1149, Jul. 1996.

Yu, J., et al., "Compact Optoelectronic Oscillator with Ultra-Low Phase Noise Performance," *Electronics Letters*, 35(18):1554-1555, Sep. 1999.

* cited by examiner

STABILIZING OPTICAL RESONATORS

PRIORITY CLAIM

This document claims the benefit of U.S. Provisional Application No. 60/967,089 entitled "Precise Stabilization of the Optical Frequency of the Whispering Gallery Mode Ethalon Device and Method" and filed Aug. 31, 2007, the disclosure of which is incorporated by reference as part of the specification of this application.

FEDERALLY SPONSORED RESEARCH OR DEVELOPMENT

The invention described herein was made in the performance of work under a NASA contract, and is subject to the provisions of Public Law 96-517 (35 USC 202) in which the Contractor has elected to retain title.

BACKGROUND

This document relates to optical resonators, including optical resonators that support optical whispering gallery modes, and devices based on optical resonators.

Optical resonators may be used to spatially confine resonant optical energy in a limited cavity with a low optical loss. The resonance of an optical resonator can provide various useful functions such as optical frequency references, optical filtering, optical modulation, optical amplification, optical delay, and others. Light can be coupled into or out of optical resonators via various coupling mechanisms according to the configurations of the resonators. For example, Fabry-Perot optical resonators with two reflectors at two terminals may use partial optical transmission of at least one reflector to receive or export light.

Optical whispering gallery mode (WGM) resonators confine light in a whispering gallery mode that is totally reflected within a closed circular optical path. Unlike Fabry-Perot resonators, light in WGM resonators cannot exit the resonators by optical transmission. Light in a WGM resonator "leaks" out of the exterior surface of the closed circular optical path of a WGM resonator via the evanescence field of the WGM mode. An optical coupler can be used to couple light into or out of the WGM resonator via this evanescent field Optical resonators can be used to generate resonator resonances in frequency as frequency references for a wide range of applications. For example, the resonance of an optical resonator can be used as a reference to which a frequency of laser can be locked to achieve a stabilized laser operation.

One technical challenge associated with using optical resonators as frequency references is stabilization of a resonance of an optical resonator against drifts and fluctuations of the resonance caused by various factors because the resonator is subject to internal changes and external perturbations. For compact optical resonators, including optical whispering gallery mode resonators with a dimension on the order of millimeters or less (e.g., $10\sim10^2$ microns), it is difficult to stabilize the optical resonators and their resonances.

SUMMARY

This document describes Techniques and devices that stabilize optical resonators.

DETAILED DESCRIPTION

Figure 1:
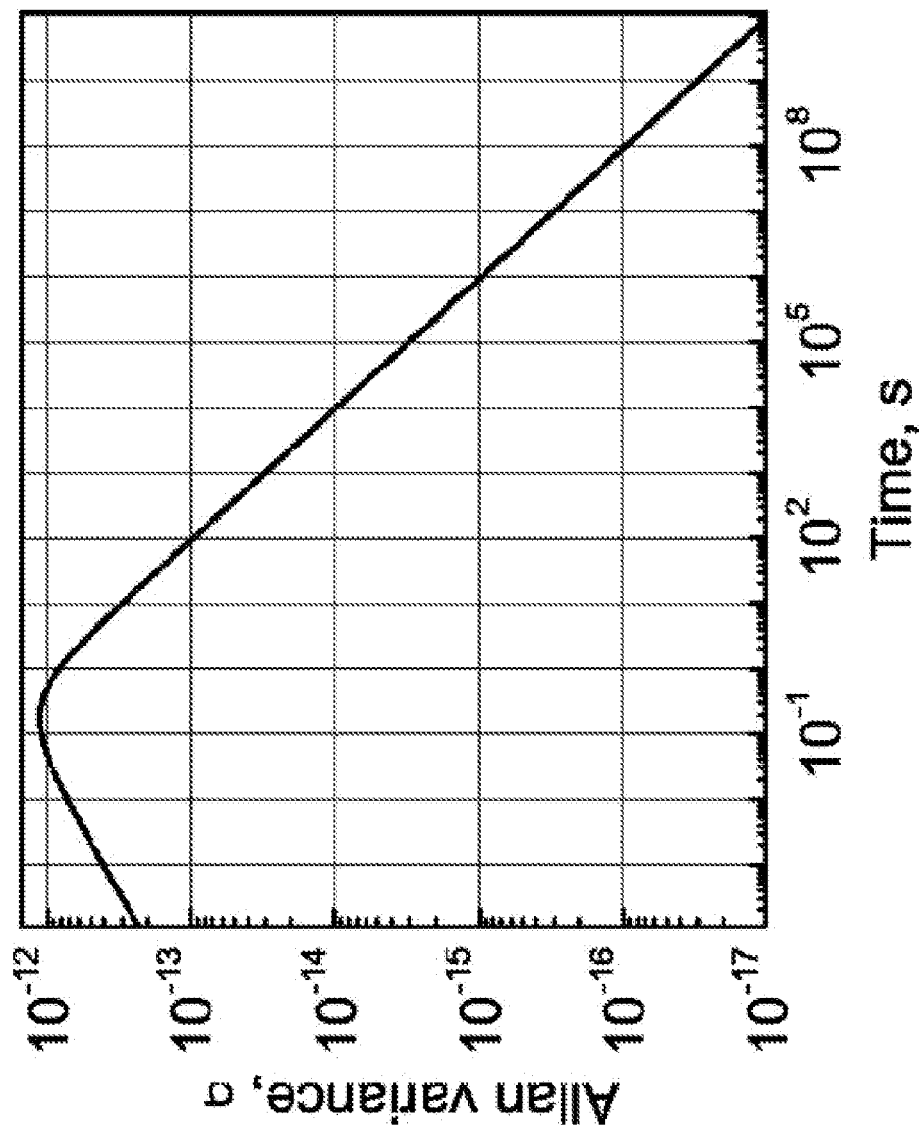
FIGS. 1-4 illustrate thermal properties of exemplary optical resonators.

The techniques and designs for stabilization of optical resonators in this document can be used for stabilizing various optical resonators including WGM resonators. The specific implementations of the techniques and designs described below make specific reference to WGM resonators as examples to illustrate various aspects of the techniques and designs.

Studies and experiments conducted on the thermal properties and stability of WGM resonators suggest that the stability of a passively stabilized millimeter-sized WGM resonator made of a certain class of crystalline materials is primarily dictated by thermorefractive fluctuations. See, Savchenkov et al., "Whispering-gallery-mode resonators as frequency references. I. Fundamental limitations," Journal of Optical Society of America (JOSA) B, Vol. 24, Issue 6, pp. 1324-1335 (2007), which is incorporated by reference as part of this document. For example, the frequency stability limit of a cylindrical WGM resonator having 100 µm in thickness and several millimeters in diameter is of the order of one part in $10^{-12}$ at an integration time of 1 second. Thermorefractive fluctuations increase inversely proportional to the mode volume, and the predicted stability is limited because of small volumes of the WGMs.

Proper selection of the resonator host material is important for the stabilization of the WGM frequency. Photorefractive fluctuations can be suppressed in some materials, such as magnesium fluoride, if a proper operation temperature is selected. Thermal expansion fluctuations become dominant in the frequency stability limit in those resonators. Specific inhomogeneous thermal expansion properties of some crystals can be used to design methods of active stabilization of fluctuations of the resonator frequency resulting from the residual thermal expansion fluctuations. The achieved frequency stability may be better than the stability dictated by the fundamental thermodynamic limit.

Suppression of the external temperature fluctuations improves the frequency stability of WGM resonators. Some WGM resonators exhibit large thermorefractive coefficients and thermal expansion coefficients and many such resonators are made of transparent optical materials. Because the light entering a WGM resonator is always confined within the dielectric material, and not in vacuum, a small change in temperature tends to cause a large frequency shift of the WGM modes. In some high-Q WGM resonators, this phenomenon may lead to thermal bistability.

Table 1 lists properties of several transparent materials that can be used to construct WGM resonators. Such properties can be used to determine the proper external temperature stabilization for achieving thermodynamically limited frequency stability of resonators made out of those materials.

TABLE 1

Linear and Nonlinear Thermorefractive Coefficients of the Ca, Ba, MgF$_2$, Sapphire, and Crystalline Quartz at T ≃ 300 K and λ = 1.5 μm[a]

| Material | $\alpha_n$ (10$^{-6}$ K$^{-1}$) | $\alpha_l$ (10$^{-6}$ K$^{-1}$) | n | ρ (g/cm$^3$) | C, [10$^6$ erg/(g K)] | κ [10$^5$ erg/(cm s K)] | $\beta_T$ (10$^{-12}$ cm$^2$/dyn) |
|---|---|---|---|---|---|---|---|
| CaF$_2$ | −8.0 [44] | 18.9 [45] | 1.4261 [44] | 3.18 [46] | 8.54 [47, 48] | 9.7 [48, 49] | 1.1 [50] |
| BaF$_2$ | −11.0 [45] | 18.7 [45] | 1.4662 [45] | 4.83 | 4.56 [51] | 7.1 [52] | 1.5 [53] |
| MgF$_2$(e) | 0.25 [54, 55] | 13.0 [56] | 1.38341 [57] | 3.18 [56] | 9.2 [47] | 30 [58] | 1.0 |
| MgF$_2$(o) | 0.6 [54, 55] | 9.0 [56] | 1.37191 [57] | 3.18 [56] | 9.2 [47] | 21 [58] | 1.0 |
| Al$_2$O$_3$(e) | 7.5 [59] | 8.1 [60] | 1.7384 [59] | 3.98 [61] | 7.61 [61] | 25.2 | 0.4 |
| Al$_2$O$_3$(o) | 7.4 [59] | 7.3 [60] | 1.7462 [59] | 3.98 [61] | 7.61 [61] | 24.1 | 0.4 |
| SiO$_2$(e) | −6.8 [62] | 7.6 [63] | 1.5363 [64] | 2.65 [63] | 7.41 | 11.7 [58] | 2.7 |
| SiO$_2$(o) | −5.2 [62] | 13.9 [63] | 1.5278 [64] | 2.65 [63] | 7.41 | 6.5 [58] | 2.7 |

[a]The data are taken from manufacturer specifications if the reference is not provided. We should note that the values vary significantly depending on the published study and/or the specifications. The variation: reaches tens of percents.
We use the following notations:
ρ is the density,
C is the specfic heat capacity (we assume that $C_P = C_V = C$),
n is the refractive index,
$\alpha_n = (1/n)(\partial n/\partial T)$ is the thermorefractive coefficient,
$\alpha_l = (1/l)(\partial l/\partial T)$ is the linear thermal expansion coefficient,
κ is the thermal conductivity coefficient,
$\beta_T = -[(1/V)(\partial V/\partial p)]_T$ is the compressibility of the resonator host material (we assume that the isothermal and adiabatic compressibilities are approximately equal).

The following expressions can be used to estimate the frequency stability of a WGM resonator:

$$\frac{\langle(\Delta\omega_{TR})^2\rangle}{\omega^2} = \alpha_n^2 \frac{k_B T^2}{C V_m \rho}, \quad (1)$$

$$\frac{\langle(\Delta\omega_{TE1})^2\rangle}{\omega^2} = \alpha_l^2 \frac{k_B T^2}{C V_r \rho}, \quad (2)$$

$$\frac{\langle(\Delta\omega_{TE2})^2\rangle}{\omega^2} = k_B T \frac{\beta_T}{9 V_r}, \quad (3)$$

where $\Delta\omega_{TR}$, $\Delta\omega_{TE1}$, and $\Delta\omega_{TE2}$ are the frequency deviations due to thermorefractive, thermal expansion, and thermoelastic fluctuations, respectively; $k_B$ is the Boltzmann's constant; T is the absolute temperature; p is the density of the resonator host material; C is the specific heat capacity; n is the refractive index; $\alpha_l = (1/l)(\partial l/\partial T)$ is the thermorefractive coefficient; $\alpha_l = (1/l)(\partial l/\partial T)$ is the linear thermal expansion coefficient; K is the thermal conductivity coefficient; $\beta_T = -[(1/V)(\partial V/\partial p)]_T$ is the compressibility of the resonator host material; and $V_m$ and $V_r$ are the volumes of the mode and the resonator, respectively. Eqs. (1)-(3) represent the square of the deviation of a mode frequency from the center of frequency distributions resulting from the corresponding thermodynamic processes. To study the deviations given by Eqs. (1)-(3) experimentally, the frequency of a WGM can be measured instantaneously to create the statistical distribution of the measurement results, and to find the square deviation of the frequency characterizing the distribution.

To estimate the required quality of the compensation of the external temperature fluctuations that would allow reaching the thermodynamic limit, the following condition is assume: $\Delta T = \langle(\Delta\omega)^2\rangle^{1/2}/[\omega(\alpha_n+\alpha_l)]$. The idea is that the influence of the external temperature fluctuations can be relaxed if thermorefractive effect compensates thermal expansion. For anisotropic materials, the following are considered: (i) WGM resonators with symmetry axis coinciding with the crystalline axis, (ii) WGMs polarized along the crystalline axis (TE modes), (iii) selection of the linear thermal expansion coefficient $\alpha_1$ and thermorefractive coefficient $\alpha_n$. Overall, such an estimate is usually valid if temperature gradients due to external temperature variations are small within the resonator. The results are shown in Table 2 below.

TABLE 2

Thermorefractive, Thermal Expansion, and Thermoelastic of WGM Frequency Stability at Room Temperature[a]

| Material | $\langle(\Delta\omega_{TR})^2\rangle^{1/2}/\omega$ | $\Delta T_{TR}$ (nK) | $\langle(\Delta\omega_{TE1})^2\rangle^{1/2}/\omega$ | $\Delta T_{TE1}$ (nK) | $\langle(\Delta\omega_{TE2})^2\rangle^{1/2}/\omega$ | $\Delta T_{TE2}$ (nK) |
|---|---|---|---|---|---|---|
| CaF$_2$ | 2.2 × 10$^{-12}$ | 80 | 2.4 × 10$^{-13}$ | 9 | 2.4 × 10$^{-12}$ | 89 |
| BaF$_2$ | 3.3 × 10$^{-12}$ | 427 | 2.6 × 10$^{-13}$ | 34 | 3.4 × 10$^{-12}$ | 446 |
| MgF$_2$ | 6.5 × 10$^{-14}$ | 7 | 1.1 × 10$^{-13}$ | 11 | 2.3 × 10$^{-12}$ | 246 |
| Al$_2$O$_3$ | 1.9 × 10$^{-22}$ | 129 | 8.8 × 10$^{-14}$ | 6 | 1.6 × 10$^{-12}$ | 109 |
| SiO$_2$ | 2.2 × 10$^{-12}$ | 303 | 2.1 × 10$^{-13}$ | 29 | 3.4 × 10$^{-12}$ | 481 |

[a]ΔT: determines the effective value of external temperature instability (quality of compensation of external technical temperature fluctuations) required to observe the limits.

Table 2 suggests that external temperature stabilization of the whole system for the listed examples should be at least on the level of 0.1 μK at an integration time of 1 s to achieve the frequency stability given by the thermodynamic limit. The stabilization should be even better for materials with a low thermorefractive constant, such as magnesium fluoride.

One primary source of the fundamental long-term instability in frequency with an integration time equal to or greater than 1 s is the thermorefractive fluctuations for WGM resonators made of calcium fluoride, sapphire, quartz and similar materials. The spectral density of the thermorefractive frequency noise could be estimated by $$S_{\delta\omega/\omega}(\Omega) \simeq \frac{k_B \alpha_n^2 T^2}{\rho C V_m} \frac{R^2}{12D} \left[ 1 + \left( \frac{R^2}{D} \frac{|\Omega|}{9\sqrt{3}} \right)^{3/2} + \frac{1}{6} \left( \frac{R^2}{D} \frac{\Omega}{8\nu^{1/3}} \right)^2 \right]^{-1}. \quad (4)$$

This equation is valid for a thin cylindrical resonator of thickness L and radius R (R>>L), $\alpha_n$ is the thermorefractive coefficient of the material, $V_m$ is the volume of the WGM mode, $v=2\pi Rn/\lambda$ is the mode order, n is the refractive index of the material, $D=\kappa/(\rho C)$ is the temperature diffusion coefficient, $\kappa$ is the thermal conductivity coefficient, and C is the specific heat capacity. The Allan variance of the WGM frequency can be estimated by the following integration:

$$\sigma^2(\tau) = \frac{2}{\pi} \int_0^\infty S_{\delta\omega/\omega}(\Omega) \frac{\sin^4(\Omega\tau/2)}{(\Omega\tau/2)^2} d\Omega, \quad (5)$$

where $S_{\delta\omega/\omega}(\Omega)$ is a double-sided spectral density.

Consider an example of a calcium fluoride resonator of radius R=0.3 cm and thickness L=0.01 cm driven with $\lambda$=1.55 μm light, where $v \cong 2\pi Rn/\lambda \approx 2.7 \times 10^4$ and $R/v^{2/3} \cong 1.1 \times 10^{-1}$. The thermal diffusivity for calcium fluoride is equal to $D=3.6 \times 10^{-2}$, hence characteristic frequencies for the process are $D/R^2=0.4$ s$^{-1}$, $Dv^{4/3}/R^2=3.2 \times 10^5$ s$^{-1}$, and $D/L^2=360$ s$^{-1}$. For $\alpha_n=0.8 \times 10^{-5}$ K$^{-1}$, and $V_m=2\pi RL \times R/v^{2/3} \cong 6 \times 10^{-6}$ cm$^3$, the following can be computed: $k_B \alpha_n^2 T^2/\rho C V_m \cong 4 \times 10^{-24}$. The evaluated Allan variance for the resonator is shown in FIG. 1.

Referring to the change of the slope of the dependence shown in FIG. 1, the integration (averaging) in Eq. (5) occurs in the vicinity of $\Omega=0$ when $\tau \to \infty$, where spectral density [Eq. (4)] is approximately constant and $\sigma^2(\tau) \sim 1/\tau$. In the case of $\tau \to 0$ the integration in Eq. (5) occurs in a wideband centered at frequency $\Omega \to \infty$, so that $S_{\delta\omega/\omega}(\Omega) \sim 1/\Omega^2$ and $\sigma^2(\tau) \sim \tau$. The monotonic function $\alpha^2(\tau)$ naturally has a maximum at some specific value of $\tau$. Increasing the Allan variance with time for small $\tau$ is not counterintuitive because the thermorefractive fluctuations result in the thermal drift of the WGM frequency. The maximum value of the drift is restricted and longer integration results in the averaging down of the fluctuations.

One advantage of crystalline WGM resonators in comparison with other solid-state resonators is that the WGM resonators can be made out of various materials with various thermorefractive constants. This choice of different resonator materials allow for selecting a particular material with properties that meet the requirements of a specific application.

Figure 2:
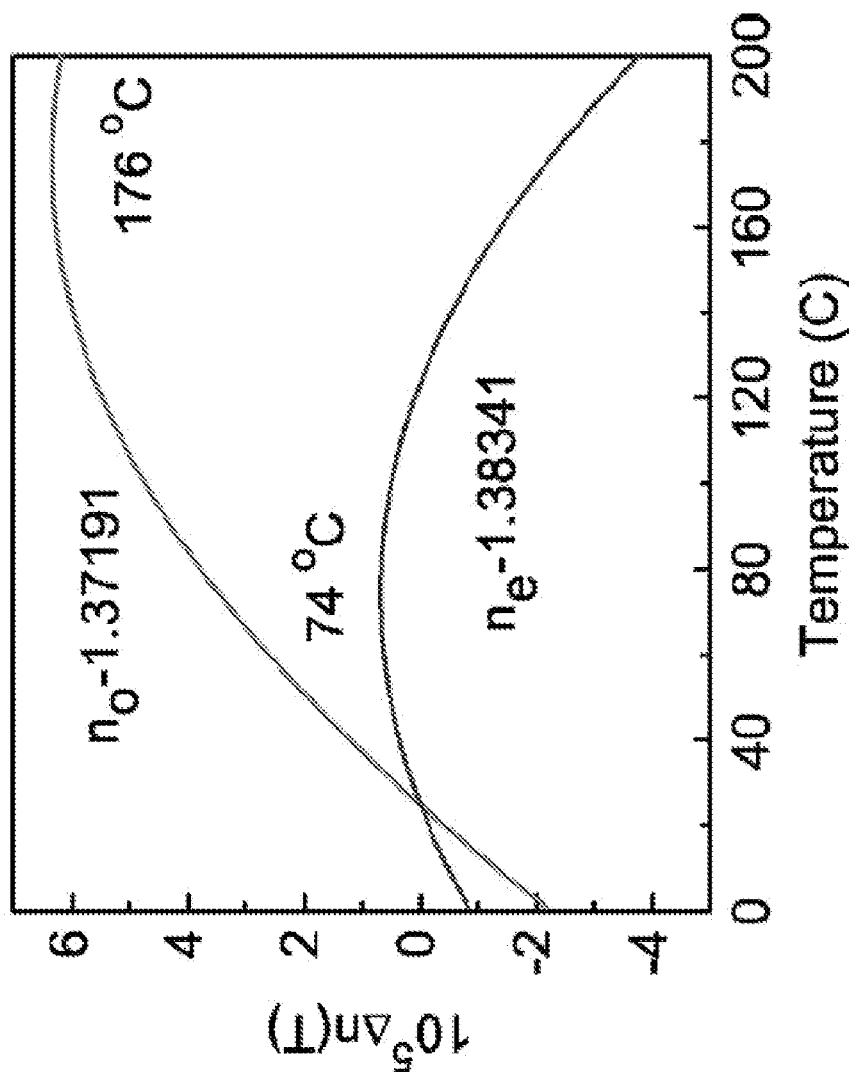

The unique properties of magnesium fluoride, for example, can be used to improve a resonator's performance. FIG. 2 shows the dependence of the refractive index of the magnesium fluoride material on temperature. The magnesium fluoride crystal used in the measurements exhibits vanishing of the extraordinary thermorefractive coefficient at ~74° C. and vanishing of the ordinary thermorefractive coefficient at ~176° C. as indicated by the slope of the curves shown in FIG. 2. Tuning the temperature of a magnesium fluoride WGM resonator to the vicinity of zero thermorefractive coefficient $\alpha_n=0$ allows one to suppress the fundamental thermorefractive noise $<(\Delta\omega_{TR})^2>^{1/2}/\omega \to 0$. Technical thermorefractive noise is also compensated because temperature stability of the order of 2 mK required to reach $\Delta n_e/n_e=10^{-14}$ is feasible.

Therefore, the thermorefractive noise of a WGM resonator does not limit the stability of WGM resonators made out of certain materials with moderate temperature stabilization in absence of a sophisticated compensation mechanism. Noise from other sources can be suppressed to improve the stability of the WGM resonator.

Different from the thermorefractive effect, thermal expansion of the WGM resonator can also cause fluctuations of the WGM frequency. The fluctuations caused by thermal expansion tend to be much smaller than the fluctuations caused by the thermorefractive effect. When the thermorefractive fluctuations are reduced to the level of fluctuations caused by the thermal expansion by either properly setting the operating temperature as shown in FIG. 2 or by a stabilization technique, the fluctuations caused by the thermal expansion needs to be reduced to improve the overall stability of the WGM resonator.

Thermodynamic temperature fluctuations of a WGM resonator can modify the resonator radius and thickness and such changes in dimension can generate noise in the WGM frequency. Assuming the basic contribution comes from the lowest-order eigenfunction of the thermal diffusion, the noise can be estimated by the following equation:

$$S_{\delta\omega/\omega} = \frac{\langle(\Delta\omega_{TE1})^2\rangle}{\omega^2} \frac{2R^2/\pi^2 D}{1 + (\Omega R^2/D\pi^2)^2}. \quad (6)$$

This equation suggests that the frequency dependence of the spectral density is determined by the slowest thermal diffusion time associated with the thermal diffusion along the radius of the resonator. Eq. (5) can be used to compute the Allan variance of the frequency of the WGM resulting from the fundamental thermal expansion fluctuations of a z-cut magnesium fluoride resonator of radius R=0.3 cm and thickness L=0.01 cm.

Figure 3:
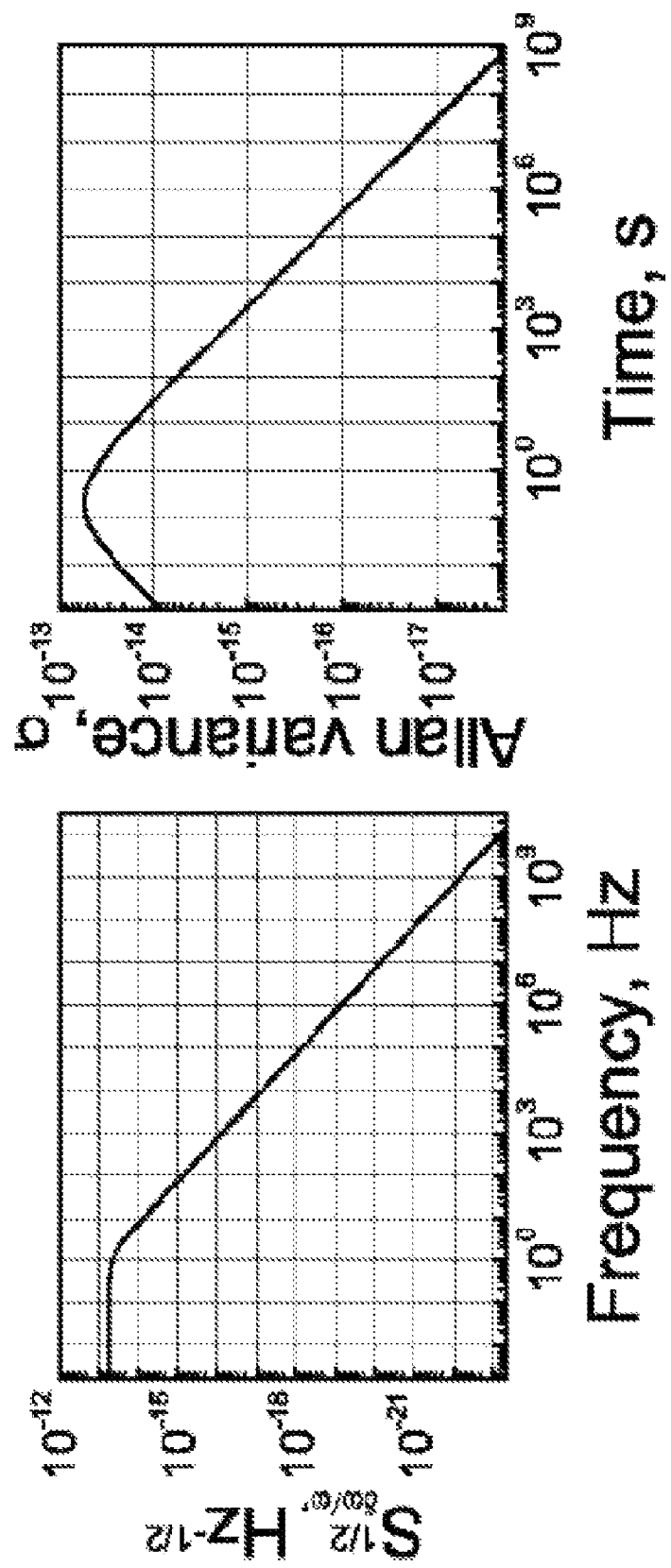

FIG. 3 shows the power spectral density and Allan variance of the frequency fluctuations caused by thermal expansion of a WGM of the above cylindrical magnesium fluoride resonator. The thermal diffusivity for magnesium fluoride is equal to $D=7.2 \times 10^{-2}$ cm$^2$/s and the characteristic frequency for the process is $D/R^2=0.8$ s$^{-1}$. Equation (6) defines the top boundary of the low-frequency spectral density.

In practical applications, the WGM resonator can be placed on a metal plate possessing a high thermal conductivity. Under this configuration, the thermal response time shortens and the time constant of $R^2/\pi^2 D$ can be replaced with $L^2/\pi^2 D$. This condition can reduce the value of the low-frequency spectral density significantly. For example, the thermal diffusivity of aluminum is $D=0.97$ cm$^2$/s at 300 K. Copper has a larger thermal diffusivity $D=1.15$ cm$^2$/s at 300 K. Placing the resonator on a polished copper plate or squeezing the resonator between two copper plates would result in more than an order of magnitude reduction of phase noise at the zero frequency. Consequently, the corresponding Allan variance can be reduced below one part per $10^{-14}$ at an integration time of 1 s. Placing a WGM resonator onto a copper plate can reduce the quality factor of the mechanical modes of the WGM resonator and this reduction can enhance the influence of thermoelastic fluctuations on the frequency stability.

One technique to increase the WGM resonator volume without significantly changing the characteristic time constant of the process is to optimize the geometric shape of the WGM resonator. For example, the WGM resonator may be constructed to have a nearly spherical shape or the shape of a cylinder with equal radius and height to increase the resonator volume. The light should travel in a small protrusion formed on the WGM resonator that produces little influence on the thermal and mechanical modes of the resonator. For instance, a nearly spherical single mode magnesium fluoride WGM resonator of radius at R=0.3 cm can be constructed to have an Allan variance less than one part per $10^{-14}$ at 1 s integration time. This improvement does not increase the thermoelastic fluctuations.

The thermoelastic effect also causes fluctuations in the WGM frequency. Referring to Table 2, other related values in Table 2 are comparable. However, the thermoelastic part $\Delta\omega_{TE2}$ comes from the mechanical oscillations of the resonator. Those oscillations have high frequencies and do not significantly modify the Allan variance of the WGM frequency for integration times at or longer than 1 s.

Figure 4:
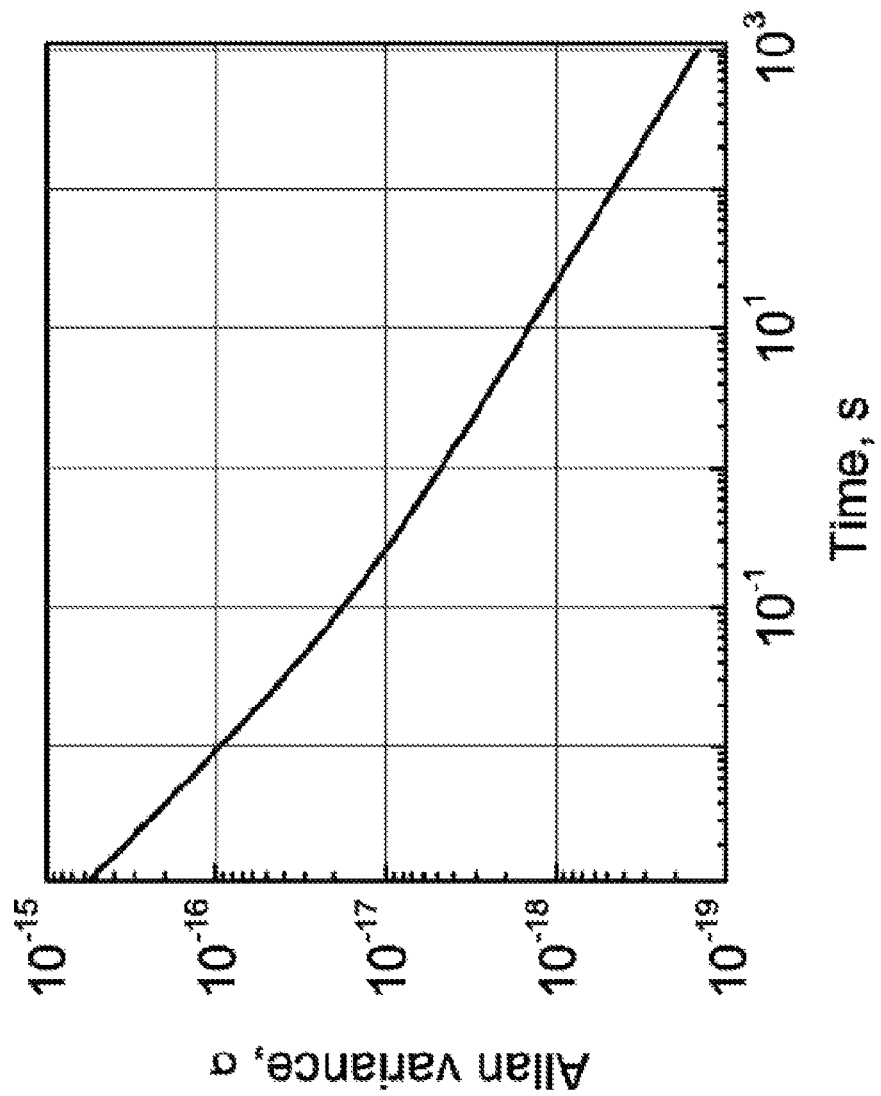

FIG. 4 shows the thermodynamically limited Allan variance for the frequency of a WGM of a magnesium fluoride resonator. The data indicates that the technical thermoelastic fluctuations are small and are not significant. It is relatively easy to isolate the resonator from external mechanical influences.

Turning now to techniques for stabilizing optical resonators such as WGM resonators, the following sections provide several examples for passively stabilizing a resonator without any active control, or actively stabilizing a resonator based on a feedback control loop. In some implementations, stabilization of the WGM frequency may involve directly controlling the thermal response of the WGM resonator to reduce unwanted averaged frequency drifts or fluctuations. In other implementations, stabilization of the WGM frequency may not involve directly controlling the thermal response of the WGM resonator. Various aspects of the resonator stabilization are described in Savchenkov et al. "Whispering-gallery-mode resonators as frequency references. II. Stabilization," JOSA B, Vol. 24, Issue 12, pp. 2988-2997 (2007), which is incorporated by reference as part of the disclosure of this document.

Figure 5B:
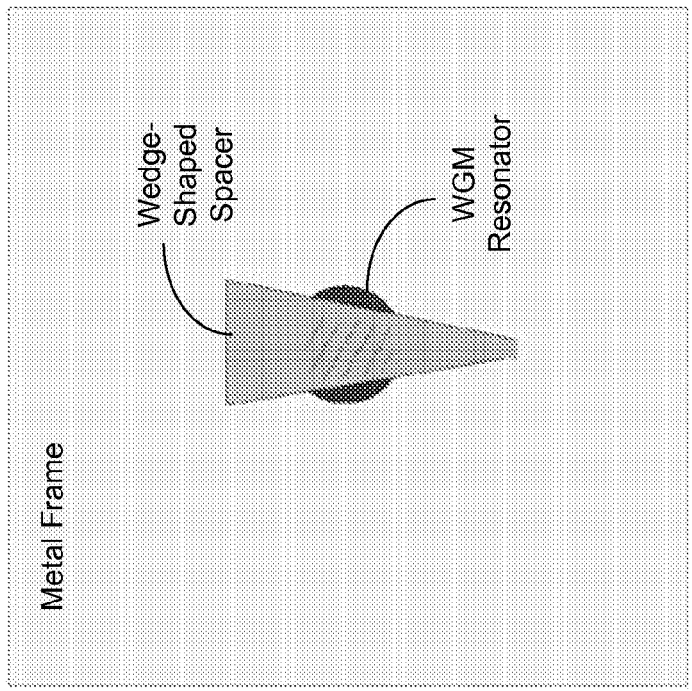
FIGS. 5A-13 show examples of resonator stabilization devices.
Figure 5A:
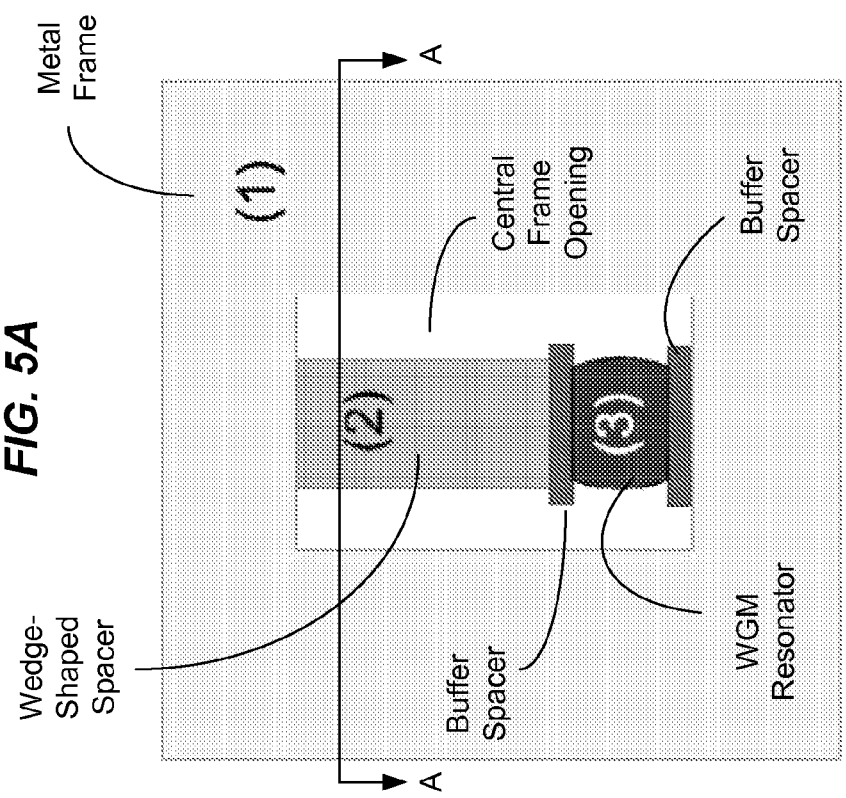
Figure 6:
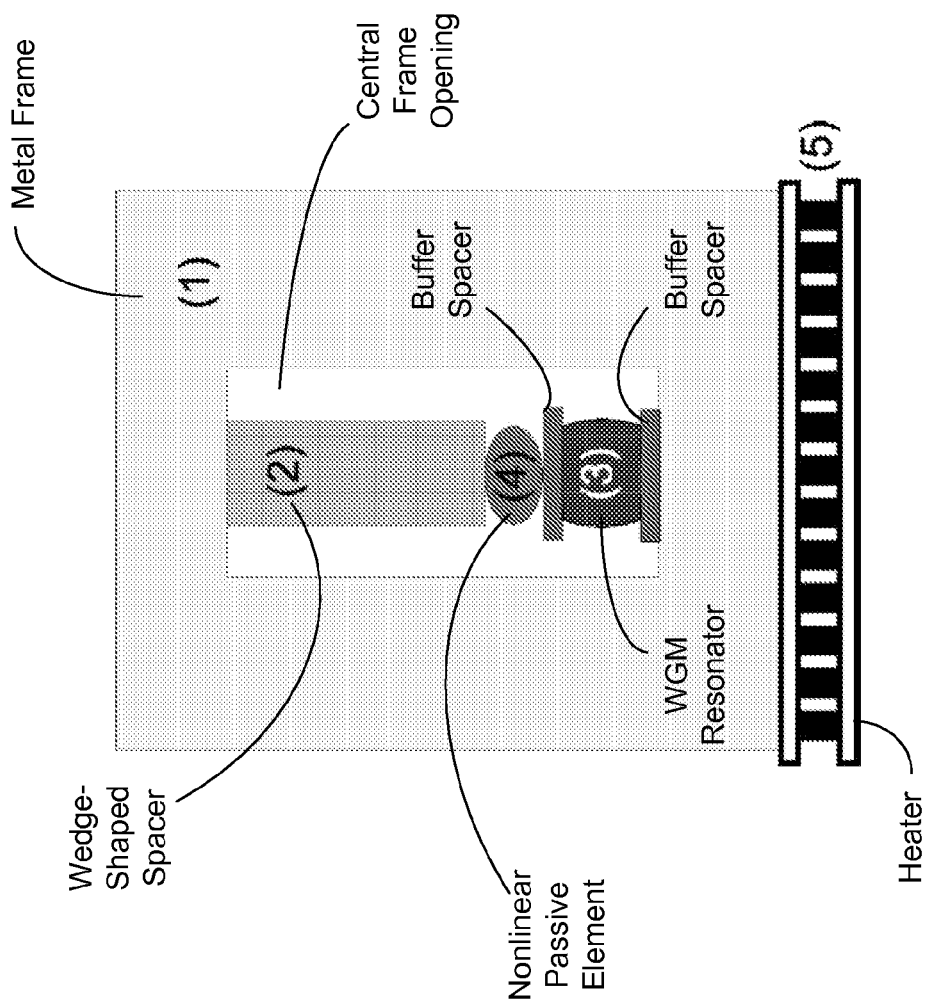

Examples of passive stabilization of optical resonators are illustrated in FIGS. 5A, 5B and 6. The optical resonator that exhibits a resonator resonance frequency that changes with temperature is held by a resonator holding device that includes different parts with different materials of different thermal expansion coefficients to provide a total thermal expansion effect that negates the frequency of the resonator caused by the temperature. For example, the resonator holding device can include a frame that has a frame part holding the optical resonator, and a spacer engaged to the frame to press the optical resonator against the frame part so that the frame part and the spacer collectively exert a compression force on the optical resonator. This compression force causes a mechanical strain in the optical resonator that in turn causes a change in the resonator resonance frequency that negates the change in the resonator resonance frequency caused by a change in temperature. Such resonator holding device thus reduces a net change in the resonator resonance frequency caused by temperature. The stabilization is passively built into the structure of the resonator holding device and does not rely on an active stabilization control mechanism.

FIGS. 5A and 5B show one example of such a passive stabilization of the resonator. The resonator holding device in this example has a metal frame that is shaped to have a central frame opening where the resonator is held. A spacer, such as a wedge-shaped spacer, has one end engaged to the frame and another end in contact with the optical resonator. The other side of the optical resonator is held by a frame part of the metal frame so that the optical resonator is sandwiched between and compressed by the frame part and the spacer. The frame and the wedge-shaped spacer are made of materials with different thermal expansion coefficients. The spacer can be made of a glass or a metal, for example. Two buffer spacers may be used to protect the resonator surfaces that interface with the frame part and the spacer, respectively. FIG. 5B shows a view along the line A-A shown in FIG. 5A to show the wedge shape of the spacer.

The sandwiched resonator is made much thinner than the frame and spacer. Under this configuration, thermal expansion of the resonator tends not to result in any significant stress of the spacer and the frame, so the stress forces in the system are determined by those parts only. The frame has a much larger cross section than the spacer to generate a much stronger force than the spacer during the entire range of thermally induced expansion or contraction. Thus, the expansion of the spacer is primarily determined by the expansion of the frame. The force applied to the sandwiched resonator is $A_2 E_2 (\alpha_2 - \alpha_1) \Delta T$, where $A_2$ is the cross section of the spacer and the resonator, $E_2$ is the stress modulus of the spacer, $\alpha_1$ is the thermal expansion coefficient of the frame, and $\alpha_2$ is the thermal expansion coefficient of the spacer.

The resonator has a thermally induced frequency tenability $d\omega/dT = (\alpha_n + \alpha_l)\omega$ and stress induced tenability $d\omega/dF$. The frequency drift of the free resonator is determined by $d\omega/dF$. Under the applied stress by the spacer and the frame in FIG. 5A, the total frequency drift is $$\Delta\omega = \left[(\alpha_n + \alpha_l)\omega + \frac{d\omega}{dF} A_2 E_2 (\alpha_2 - \alpha_1)\right]\Delta T. \tag{A1}$$

Hence, the thermal frequency drift is compensated if $\Delta\omega/\Delta T=0$. The values of $d\omega/dT$ and $d\omega/dF$ can be inferred from experimental measurements and depend on the host material and the shape of the resonator. The cross-section area of the spacer and the resonator can be selected based on the specific needs of the device. The spacer can have, e.g., a wedge-like shape as shown in FIG. 5B for adjusting $A_2$. Various other compensators of different shapes can be designed based on this principle.

The above passive stabilization is based on the linear expansion of different parts of the resonator holding device. It can be technically difficult to select parameter $A_2$ to precisely compensate the thermal WGM frequency drift. For example, inevitable errors of the mechanical manufacturing of the compensator elements can lead to incomplete compensation of the frequency drift of the WDM resonance. For another example, the thermally induced frequency drifts or fluctuations in the resonator may exhibit nonlinear dependence with the change in temperature. Therefore, it may be desirable to provide a nonlinear element whose dimension changes nonlinearly with the temperature to supplement the linear compensation provided by the frame and the spacer.

FIG. 6 illustrates an example in which a nonlinear passive element is engaged between the resonator and the spacer. The nonlinear element is responsive to a change in temperature to change a dimension in a nonlinear relationship with the change in temperature to cause a nonlinear strain in the optical resonator with respect to the change in temperature. As an example, the nonlinear element can be designed to expand and contract nonlinearly under stress so the force exposed to the sandwiched resonator depends on temperature as $A_2 E_2 (\alpha_2 - \alpha_1)\Delta T + A(\Delta T)^2$, where the coefficient A for the nonlinear term depends on the structure and shape of the nonlinear element. To describe a nonlinear compensation in FIG. 6, the Eq. (A1) is now modified as $$\Delta\omega = \left\{(\alpha_n + \alpha_l)\omega + \frac{d\omega}{dF}[A_2E_2(\alpha_2 - \alpha_1) + A\Delta T]\right\}\Delta T. \quad (A2)$$

In FIG. 6, an oven may be provided to enclose the resonator in a chamber and to heat the chamber to an elevated temperature. This can improve the nonlinear stabilization provided by the nonlinear element. The temperature of the nonlinear element can be controlled to control the working point of the nonlinear element. For example, the working point can be shifted by the heating towards both the first and second order compensation temperature regions. The nonlinear frequency shift controlled by an oven allows fixing the incomplete compensation in the linear compensation. The compensator can potentially reduce the required nanoKelvin level temperature stabilization accuracy by several orders of magnitude.

Figure 7:
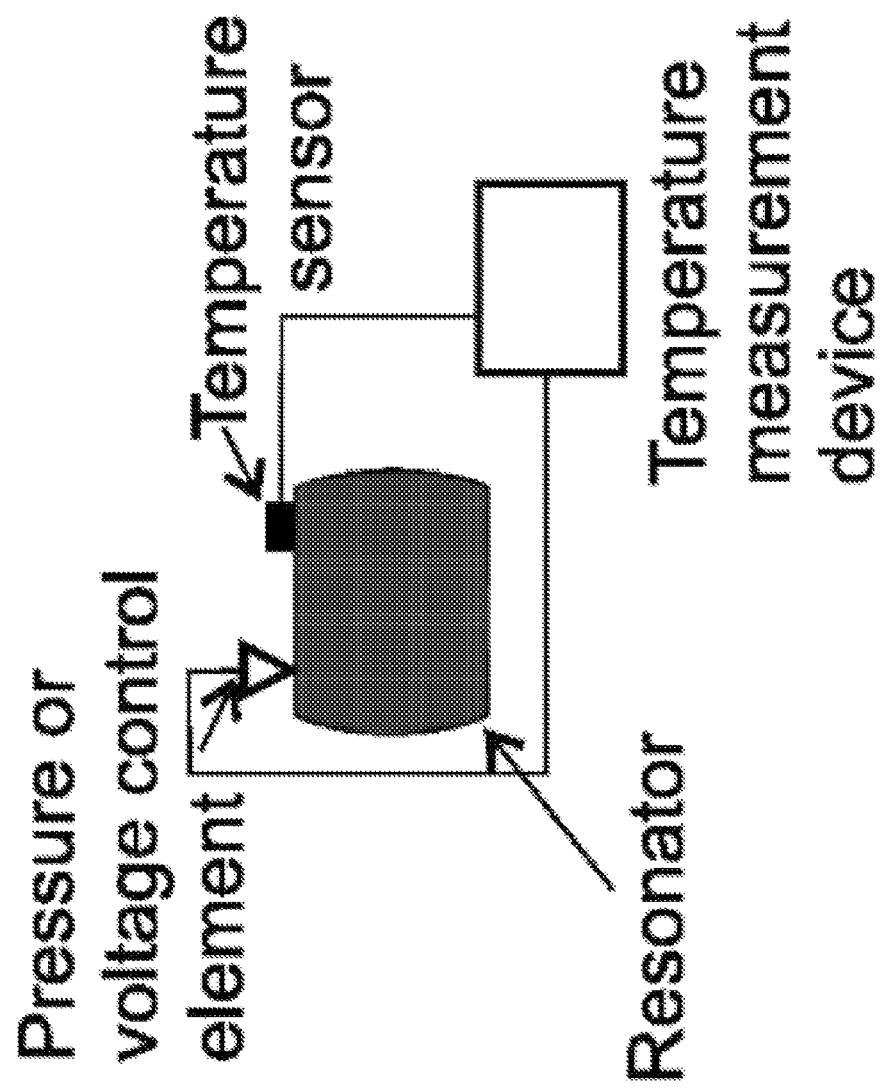
Figure 8:
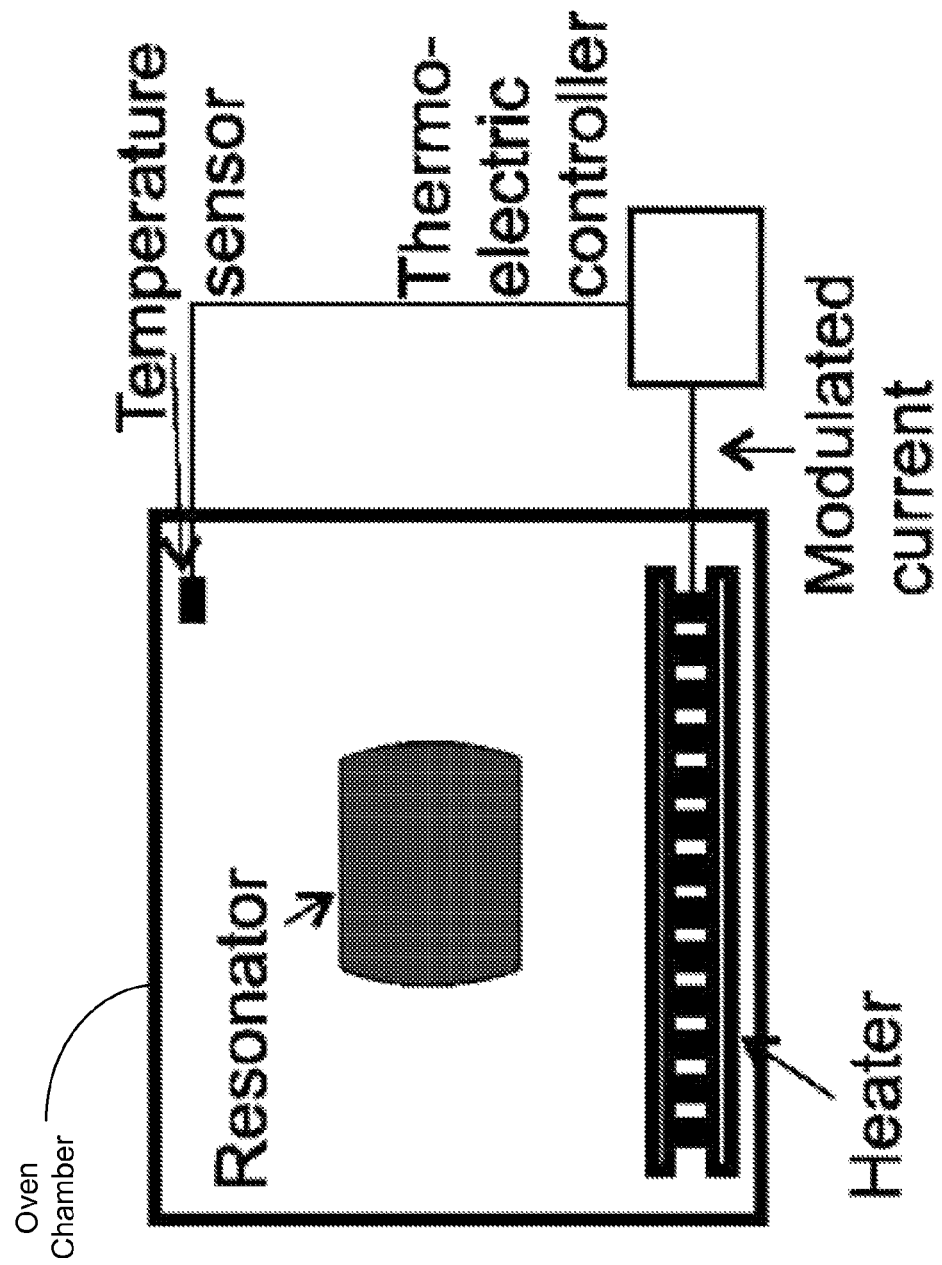
Figure 9:
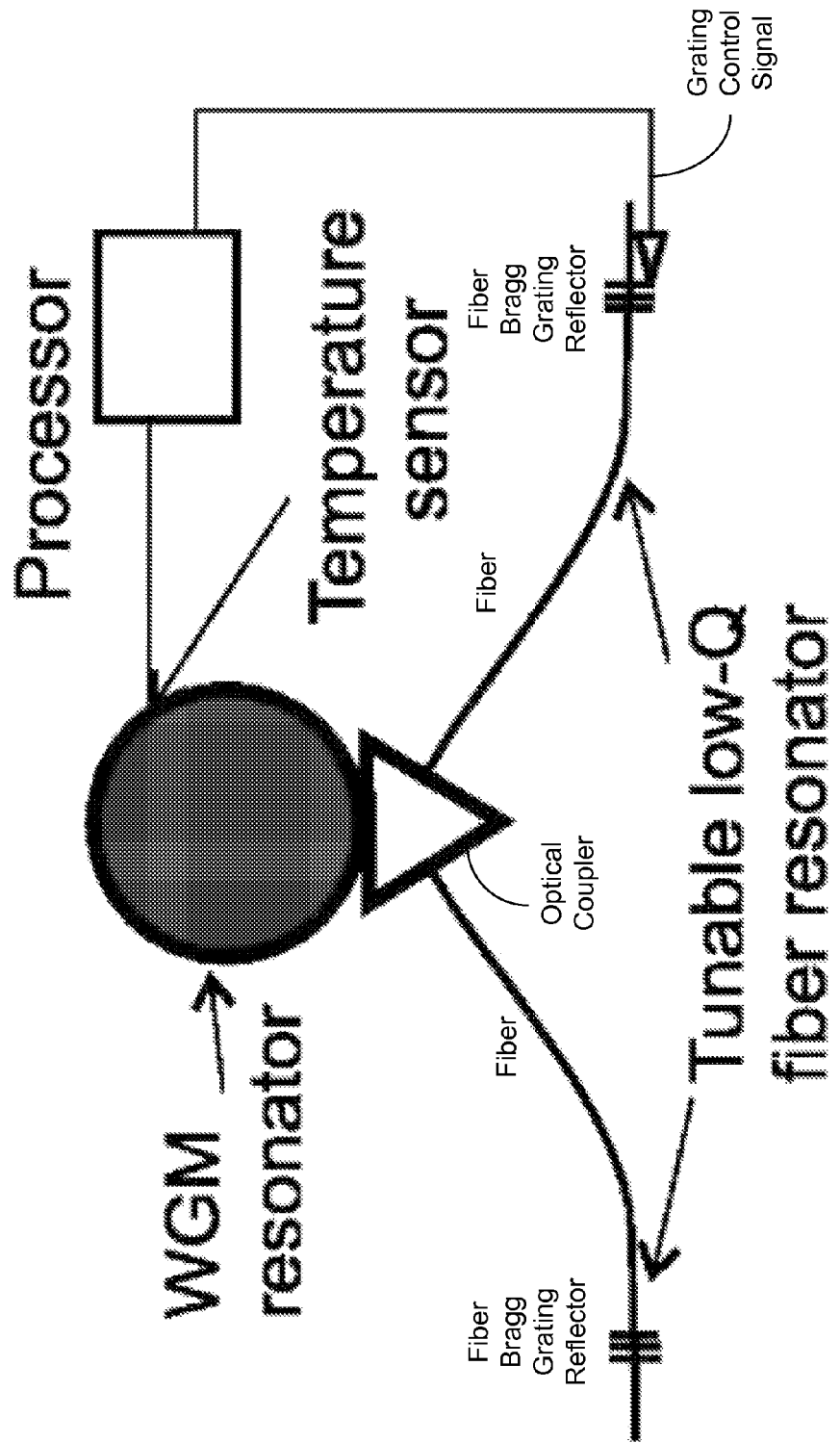

Active stabilization uses a sensing mechanism to monitor the frequency shift of the WGM resonance of the resonator and applies a control in response to the monitored shift to counter act the shift. Active stabilization is dynamic and adaptive and thus can be more effective than the passive stabilization. FIGS. 7, 8 and 9 shows three examples of active stabilization of a resonator based on a feedback control loop. The temperature of the resonator is monitored by a single (or several) thermally sensitive elements attached to the resonator surface. The techniques considered here can be used for suppressing the frequency fluctuations due to technical temperature drifts. In operation, a control is applied over the optical resonator to control and tune the resonator resonance frequency and the control over the optical resonator is independent of temperature. Hence, in response to a change in the measured temperature, the control over the optical resonator is adjusted to cause a change in the resonator resonance frequency that negates a change in the resonator resonance caused by the change in the measured temperature.

The control over the optical resonator can be implemented in various configurations. In one example, the control can exert a pressure on the optical resonator to cause a mechanical strain in the optical resonator that causes a change in the resonator resonance frequency. In another example, the control over the optical resonator can apply a control voltage to the optical resonator to cause a change in the resonator resonance frequency. In this regard, the optical resonator may exhibit an electro-optic effect under the control voltage to change the resonator resonance frequency.

FIG. 7 shows an example in which a resonator control is provided to control the optical resonator to control and tune the resonator resonance frequency. The resonator control is independent of temperature. This example uses at least one temperature sensor to measure and monitor a temperature of the optical resonator. The resonator control is responsive to a change in the measured temperature from the temperature sensor to control the optical resonator to change the resonator resonance frequency in a way that negates a change in the resonator resonance caused by the change in the measured temperature.

FIG. 8 shows another example in which an oven is provided to enclose the optical resonator and a heater is used to elevate a temperature of the oven to set a temperature of the optical resonator at an elevated resonator temperature. A temperature sensor measures a temperature of the oven. A controller in communication with the temperature sensor is used to receive the measured temperature of the oven and operable to control and stabilize the temperature of the oven to maintain the optical resonator at the elevated resonator temperature to in turn stabilize the resonator resonance frequency.

FIG. 9 shows another active stabilization system applying an indirect control over the resonator in response to a temperature change in the resonator. This system includes a first optical resonator to be stabilized, e.g., a WGM resonator, that exhibits a resonator resonance frequency which changes with temperature. At least one temperature sensor is provided to measure the temperature of the first optical resonator. Notably, a second optical resonator is optically coupled to the first optical resonator to exchange light with the first optical resonator. In this example, the second optical resonator is a fiber Fabry-Perot resonator formed in a fiber by two fiber Bragg grating reflectors. A section of the fiber between the two reflectors is coupled to the first resonator either by direct evanescent coupling or by using an optical coupler as shown. The second optical resonator is tunable and has a resonator quality factor lower than the first optical resonator. Here, the two grating reflectors can have low reflectivities.

A resonator controller is provided to be in communication with the sensor to receive the measured temperature change and applies a control signal to the second optical resonator based on the measured temperature to adjust and tune a resonator resonance frequency of the second optical resonator. This controller may include a microprocessor. This adjustment causes, via optical coupling between the first optical resonator and the second optical resonator, a change in the resonator resonance frequency of the first optical resonator to negate a change in the resonator resonance caused by the change in the measured temperature. Therefore, in this example, the first resonator (WGM resonator) is not directly controlled by the feedback control. Rather, the second optical resonator is controlled and the optical coupling between the two resonators allows the first resonator to be controlled by the second resonator.

Optionally, a direct control mechanism can be provided to the first resonator to apply a direct control over the first optical resonator to control and tune the resonator resonance frequency of the first optical resonator. In response to a change in the measured temperature, the direct control mechanism adjusts the direct control over the first optical resonator to cause a change in the resonator resonance frequency that, in combination with optical coupling between the first optical resonator and the second optical resonator, negates a change in the resonator resonance caused by the change in the measured temperature. Such direct control over the first resonator may be the controls shown in FIGS. 7 and 8.

These methods can be configured to provide one or more distinctive features. In the scheme with temperature compensated resonator the temperature of the resonator oscillates freely. The frequency stability is obtained using a temperature independent phenomena. In the scheme of oven-controlled resonator the temperature of the whole system is stabilized. In the scheme involving microprocessor stabilization the frequency of the WGMs is tuned using an additional resonator, and the WGM resonator is not disturbed. A combination of the two or more of the techniques may be used to provide better frequency stability as compared with the results achieved with each particular method.

The above active control approach can be implemented based on various optical modes in a WGM resonator. It is possible to reach high-frequency stability of WGMs properly selecting the operating conditions along with the host material as well as the morphology of the resonators. Two or more WGMs in a WGM resonator can be used provide effective active stabilization over the resonator. For example, a "triplemode" technique based on three WGMs in a resonator can be used to provide stabilization of the WGM frequency better than the fundamental thermodynamic limit.

Figure 10:
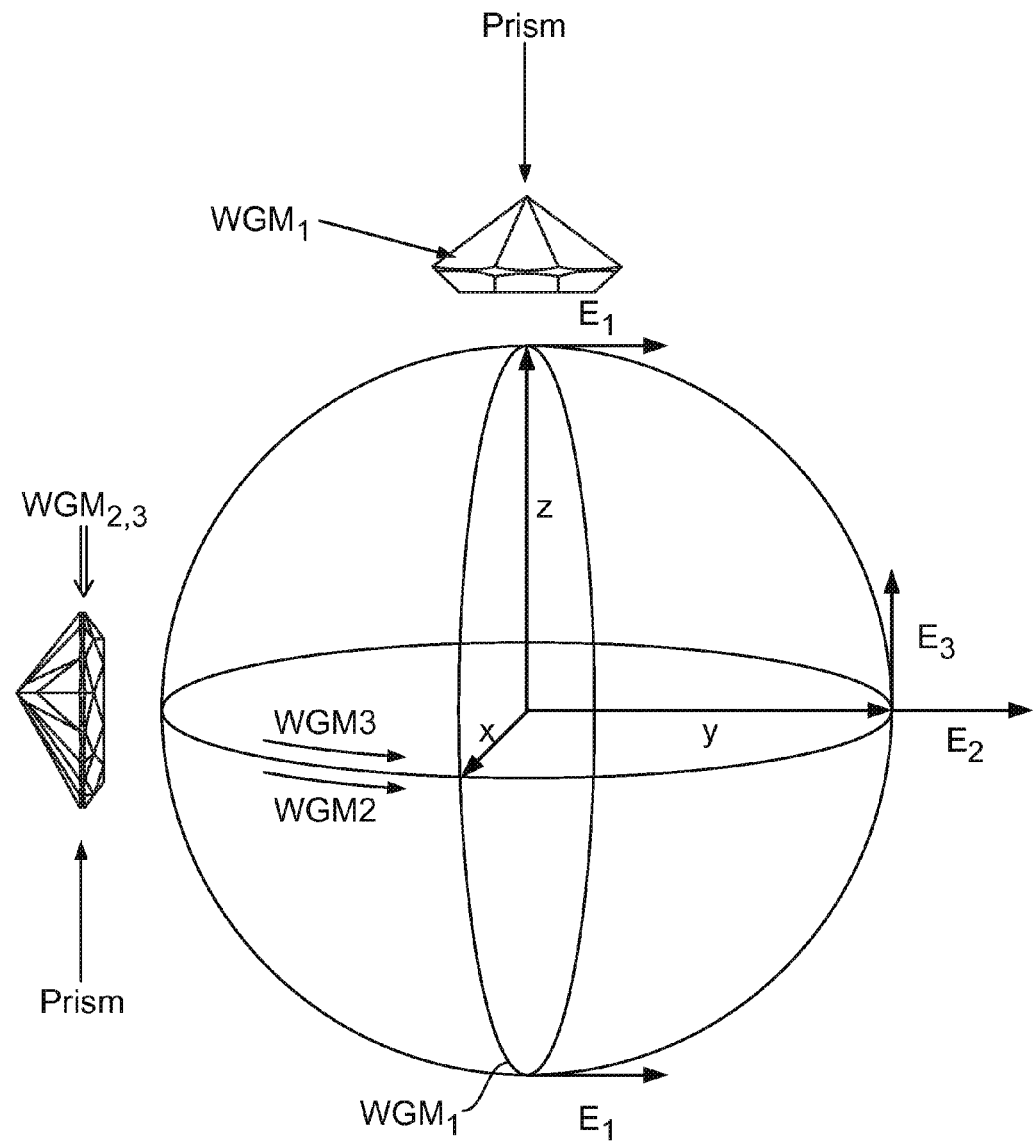

FIG. 10 shows a spherical WGM resonator with three WGMs: WGM1 in the xz plane and WGM2 and WGM3 in the xy plane. The WGM1 has a polarization E1 along the y direction and circulates in the xz plane. The WGM2 and WGM3 circulate in the xy plane with mutually orthogonal polarizations: E2 is along the y direction and E3 is in the x direction. A first optical coupler is provided to inject light into the WGM1 mode and a second optical coupler is provided to inject light into the WGM2 and WGM3 modes. This resonator can be a spherical magnesium fluoride resonator with crystalline axis corresponding to the Z axis of a coordinate frame.

These three WGMs can be used to suppress both thermorefractive and thermal expansion noise. Let us consider a spherical magnesium fluoride resonator with crystalline axis corresponding to the Z axis of a coordinate frame. The resonator is kept at 176° C. where modes polarized perpendicularly to the Z axis have a negligible thermorefractive effect. We propose to excite TM mode in the XY plane and TE mode in the XZ lane. Both these modes have identical vanishing thermorefraction. A comparison of the frequency difference between these modes ($\omega_{RF}+\Delta\tilde{\omega}_{RF2}$) with the frequency of RF clocks gives averaged resonator temperature because $$\Delta\tilde{\omega}_{RF2} \sim \omega(\alpha_{lo}-\alpha_{le})\Delta T_R, \quad (7)$$

where $\Delta\tilde{\omega}_{RF2}$ is the variation of the frequency difference between two modes determined by the temperature fluctuations of the resonator, $\omega$ is the optical frequency, and $\alpha_{lo}$ ($\alpha_{le}$) is the thermal expansion coefficient for X and Y (Z) directions. The third mode, TE, is excited in the XY plane. The frequency difference between this mode and the TM mode in the same plane contains information about the temperature in the WGM channel. Both modes are influenced by the thermal expansion in the same way. Using results of the temperature measurements one creates a proper feedback and/or compensation scheme that results in suppression of both thermorefractive and thermal expansion fluctuations for the TM mode family in the XY plane. The relative stability of those modes is determined by expression $$\frac{\Delta\omega_{TM}}{\omega} \sim \frac{\alpha_{lo}}{\alpha_{lo}-\alpha_{le}}\frac{\Delta\tilde{\omega}_{RF2}}{\omega}. \quad (8)$$

It is possible to achieve the following $$\Delta\omega_{TM} \sim \tilde{\omega}_{RF2} \text{ if } \alpha_{lo} \neq \alpha_{le}.$$

It is also possible to measure the resonator temperature with sensitivity better than the fundamental thermodynamic limit. The measurement sensitivity is limited by $\Delta\tilde{\omega}_{RF2}/[\omega(\alpha_{lo}-\alpha_{le})]$, which can be very small if $\Delta\tilde{\omega}_{RF2}$ is small enough. Hence, the triple-mode technique results in a possibility of compensation of the thermodynamic noises better than the fundamental thermodynamic limit. The suppression of the fundamental thermorefractive frequency fluctuations of an optical mode can be achieved by locking this mode to an ultrastable optical frequency reference. The advantage of the proposed technique is in the possibility to stabilize optical frequency beyond the thermodynamic limit using a RF reference. This feature will result in creation of stable UV as well as FIR lasers using crystalline WGM resonators.

Figure 11:
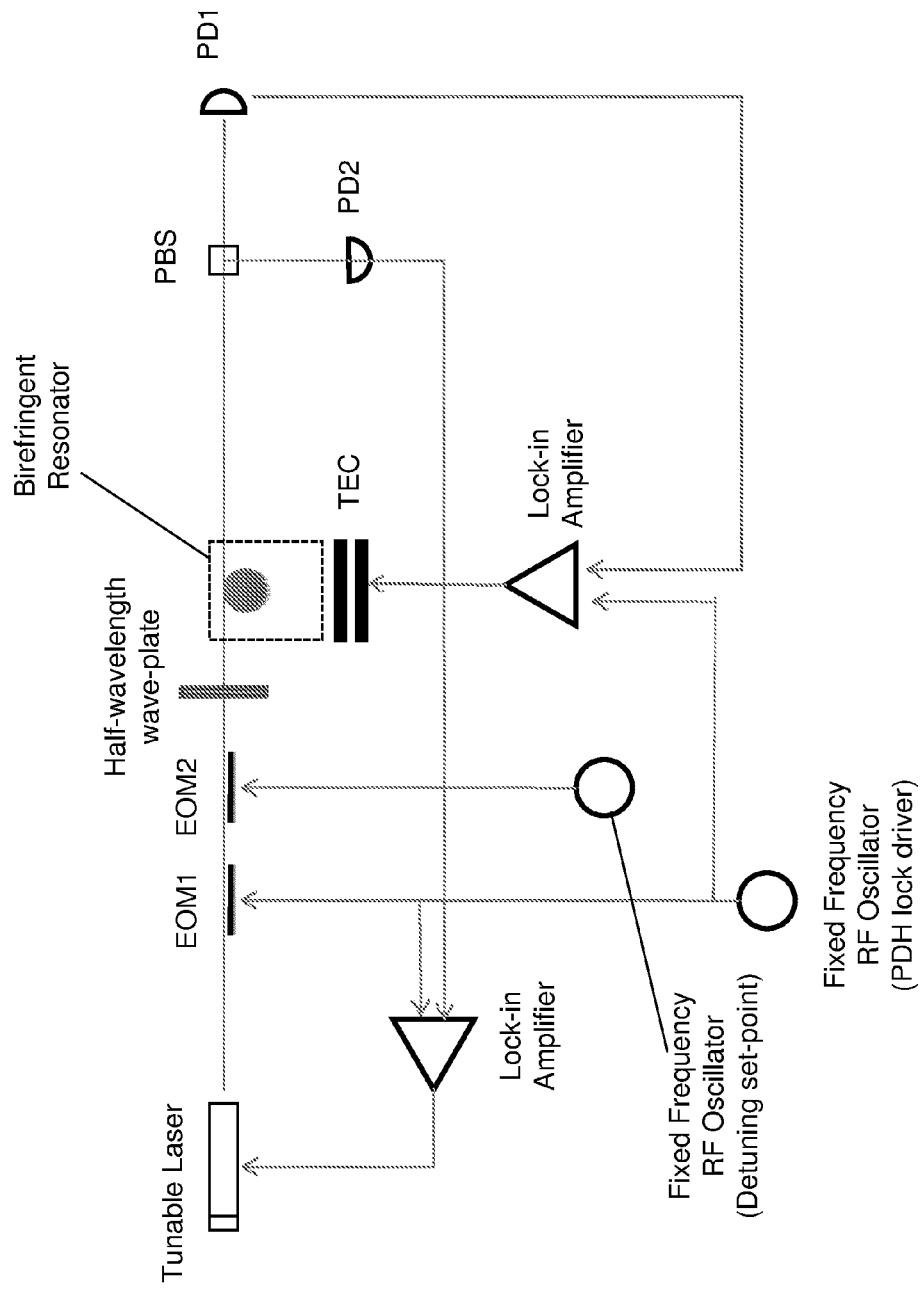
Figure 12:
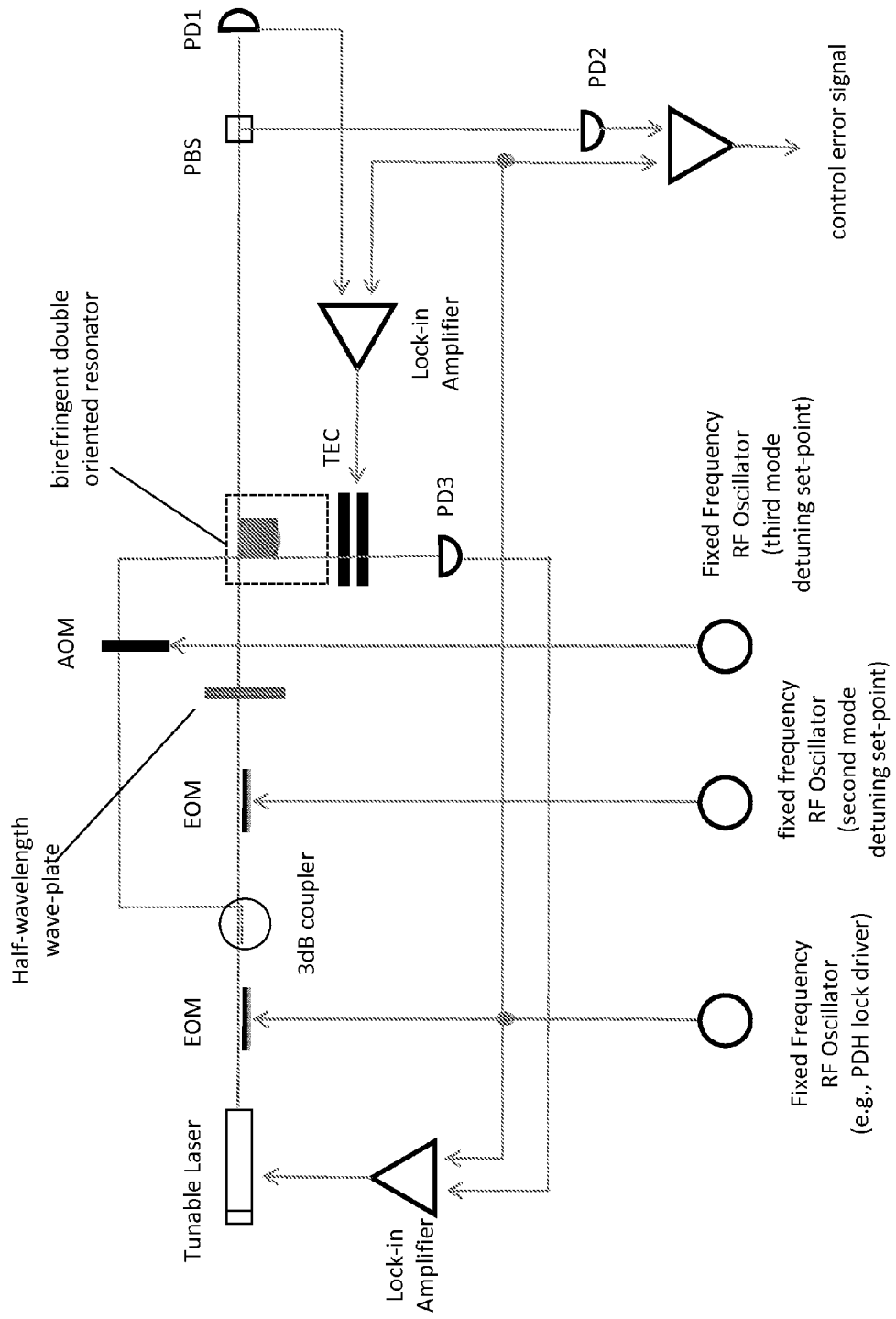

FIGS. 11 and 12 show two examples on resonator stabilization based on two or more WGM modes shown in FIG. 10.

FIG. 11 show a resonator stabilization device based on two polarization modes in a birefringent WGM resonator. A tunable laser is used to generate a CW laser beam. Two electro-optic modulators, EOM1 and EOM2, are provided downstream from the laser to modulate the CW laser at two fixed RF frequencies. Two RF oscillators can be used to provide the oscillation signals at the two RF frequencies. The modulated laser beam is injected via evanescent coupling into the birefringent WGM resonator that has polarization components in polarization directions of both ordinary and extraordinary polarization waves in whispering gallery modes. These two polarization modes can be the WGM2 and WGM3 illustrated in FIG. 10. Due to the modulations by EOM1 and EOM2, the light in the resonator has a first optical component at a first optical frequency in resonance with the ordinary polarization wave and a second optical component at a second optical frequency in resonance with the extraordinary polarization wave. The change in a difference between the first optical frequency and the second optical frequency is monitored and, based on the change in the frequency difference, the optical resonator is controlled to reduce the monitored change in the difference between the first optical frequency and the second optical frequency to stabilize the resonator resonance frequency of the optical resonator.

This an example of a dual-mode stabilization under the active stabilization class. The basic idea of the dual-mode frequency stabilization is to measure the temperature of the resonator using the resonator modes themselves, without use of an external temperature sensor. Frequency difference between two WGMs having different thermorefractive coefficient should be compared with relatively stable RF frequency and the resultant signal should be used for both temperature measurement and temperature compensation. The temperature measurement is also possible if one uses two optical WGMs separated by an octave. An advantage of the dual-mode stabilization technique is its ability to monitor the temperature of the material inside the WGM channel. External sensors show local temperatures and are unable to get such information.

The method of stabilization is applicable to a WGM resonator made of a birefringent medium. The resonator is interrogated with coherent light polarized 45° with respect to the polarization of both the ordinary and extraordinary modes of the resonator. The light is modulated by a tunable RF source. The horizontally polarized component of the light is fed into an ordinarily polarized WGM. The carrier frequency of the laser is locked at the center of the mode. A sideband of the modulated light is fed into and locked to an arbitrary selected extraordinarily polarized mode. It is possible to use two independent lasers locked to two differently polarized modes instead of the single laser and the modulator. The modulation frequency (or the beating frequency of the two lasers) becomes a measure of the frequency difference between the ordinarily and extraordinarily polarized modes. Change of the temperature $\Delta T_m$ in the WGM channel results in frequency shift $\Delta\omega_{RF}$ of the RF frequency by $$\Delta\omega_{RF1}=\omega(\alpha_{no}-\alpha_{ne})\Delta T_m, \quad (C1)$$

where $\omega$ is the optical frequency, and $\alpha_{no}$ ($\alpha_{ne}$) is the thermorefractive coefficient for ordinarily (extraordinarily) polarized light.

Let us estimate the frequency shifts for a z-cut magnesium fluoride resonator interrogated with 1.55 µm light ($\omega=1.2\times 10^{15}$ rad/s), and assume that the resonator is kept at 74° C., when $\alpha_{ne}=0$ and $\alpha_{no}\cong 4\times 10^{-7}K^{-1}$. We find $\Delta\omega_{RF1}/2\pi=80\Delta T_m$ MHz. Monitoring the RF frequency with a modest accuracy of ~1 kHz per 1 s and subsequently actively stabilizing the temperature results in a significant (better than one part per $10^{-14}$ per 1 s integration time) suppression of the thermorefractive frequency fluctuations for the TE mode. The monitoring is simple because the spectral width of WGMs should not exceed several kilohertz for $Q>10^{10}$ (no mode overlap). Therefore, dual-mode frequency stabilization results in a significant suppression of the photorefractive frequency noise.

The measurement accuracy of the temperature deviation inside the WGM channel can be very high. A simple locking technique is capable of determining the center of the line of a WGM with much better precision than the width of the resonance. For instance, a laser locked to a several kilohertz linewidth WGM can have frequency deviation relatively to the WGM less than 0.1 Hz per 1 s integration time. A good quartz oscillator can have 1 MHz carrier frequency with Allan variance of $10^{-7}$ at 1 s integration time. The measurement of $\Delta\omega_{RF1}$ using the laser and the oscillator gives an ability to monitor the mode channel temperature fluctuations with an accuracy exceeding 1 nK at 1 s integration time.

The accuracy is limited by the incomplete mode overlap and cross-phase modulation noise. An incomplete mode overlap results in somewhat uncorrelated temperature fluctuations for the TE and TM WGMs. This effect is not important if the measurement occurs in the vicinity of the point of zero thermal refractivity for any of the modes. The measurement primarily gives information about the temperature within the channel of the mode with nonzero thermorefractive coefficient. The effect of the cross-phase modulation is of the same order of magnitude as the effect of self-phase modulation, which is negligibly small [38].

Thermal expansion results in nearly identical drift of both TE and TM modes. The relative drifts of the optical frequency as well as the frequency separation between two modes are identical. The overall expansion of the resonator due to a change of the averaged temperature ($\Delta T_R$) results in a frequency shift between any two WGMs separated by frequency $\omega_{RF}$ given by $$\Delta\omega_{RF2} \cong \omega_{RF}\alpha_l \Delta T_R. \quad (C2)$$

It can be found that $\Delta\omega_{RF2}/2\pi \cong 10 \Delta T_R$ for a z-cut magnesium fluoride resonator with $\omega_{RF}/2\pi=1$ MHz. This drift is small compared with the thermorefractive drift $\Delta\omega_{RF1}$. It can be difficult to compensate for the random thermal expansion using information on TE-TM frequency detuning. The thermal expansion fluctuations can be suppressed by increasing the thermal conductivity of the setup. Unfortunately the thermal expansion related noise is eliminated only if the thermal conductivity becomes infinitely large. The more conventional way is to compensate for the random deviation of the optical frequency using error signal generated by two optical modes with substantially different thermal expansion coefficients, similar to the dualmode technique described above.

The geometrical approach of compensation for linear expansion is rather labor consuming. An advantage of using WGM resonators for frequency stabilization is the ability to manufacture the resonators practically out of any optically transparent crystal. Novel materials of zero thermal expansion can provide a much simpler conventional dual-mode technique of frequency stabilization. It is known that there are crystals with negative and zero thermal expansion at some specific temperature. Doping changes the properties of these crystals. Hence, it is not impossible to create an optically transparent crystal with zero thermal expansion at room temperature. Application of the stabilization technique discussed above will result in the creation of a WGM resonator possessing an extremely high-frequency stability.

In principle, the dual-mode technique allows for frequency stabilization better than the thermodynamic frequency limit for the both thermorefractive and thermal expansion fluctuations. This is possible in a ring resonator made of a thin crystalline wire where the WGM volume coincides with the volume of the resonator. However, technical implementation of such a resonator is problematic.

In the example in FIG. 11, the light in the resonator is coupled out to a polarization beam splitter (PBS) to split the two polarization modes into two different photodetectors, PD1 and PD2. A lock in amplifier receives the output from the PD2 and the output from the oscillation signal that drives the EOM1 to produce a control signal that controls the tunable laser. A second lock-in amplifier receives the output of the PD1 and the oscillation signals that drives the EOM1 to produce a second control signal. This control signal is applied to a thermal control unit, such as a TEC unit, that is in thermal contact with the resonator to control the temperature of the resonator. The resonator may be enclosed in a chamber to provide better thermal control by the thermal control unit.

FIG. 12 shows an example of the triple mode stabilization system discussed above with respect to FIG. 10. The CW laser from the tunable laser is first modulated by EOM in response to a first RF oscillation signal. A beam splitter, e.g., a 3 dB coupler, is used to split the modulated beam into a first beam and a second beam along two paths. In the first path, a second EOM is provided to modulate the first beam at a second, different RF frequency. In the second path, another optical modulator, e.g., an acousto-optic modulator (AOM), is used to modulate the second beam at a third frequency. Both first and second beams are evenascently coupled into the resonator. The output of the PD1 that detects the first beam coupled out of the resonator is combined with the first RF signal in a lock-in amplifier to control the thermal control unit for the resonator. The second beam coupled out of the resonator is received by the photodetector D3 and is combined with the first RF signal via the lock-in amplifier to control the tunable laser. The photodetector D2 is not used for stabilization and is used to provide an error monitor signal. Hence, the WGM1 mode and one of the WGM2 and WGM3 modes are used in FIG. 12 to stabilize the resonator against both thermorefractive noise and thermal expansion noise.

Figure 13:
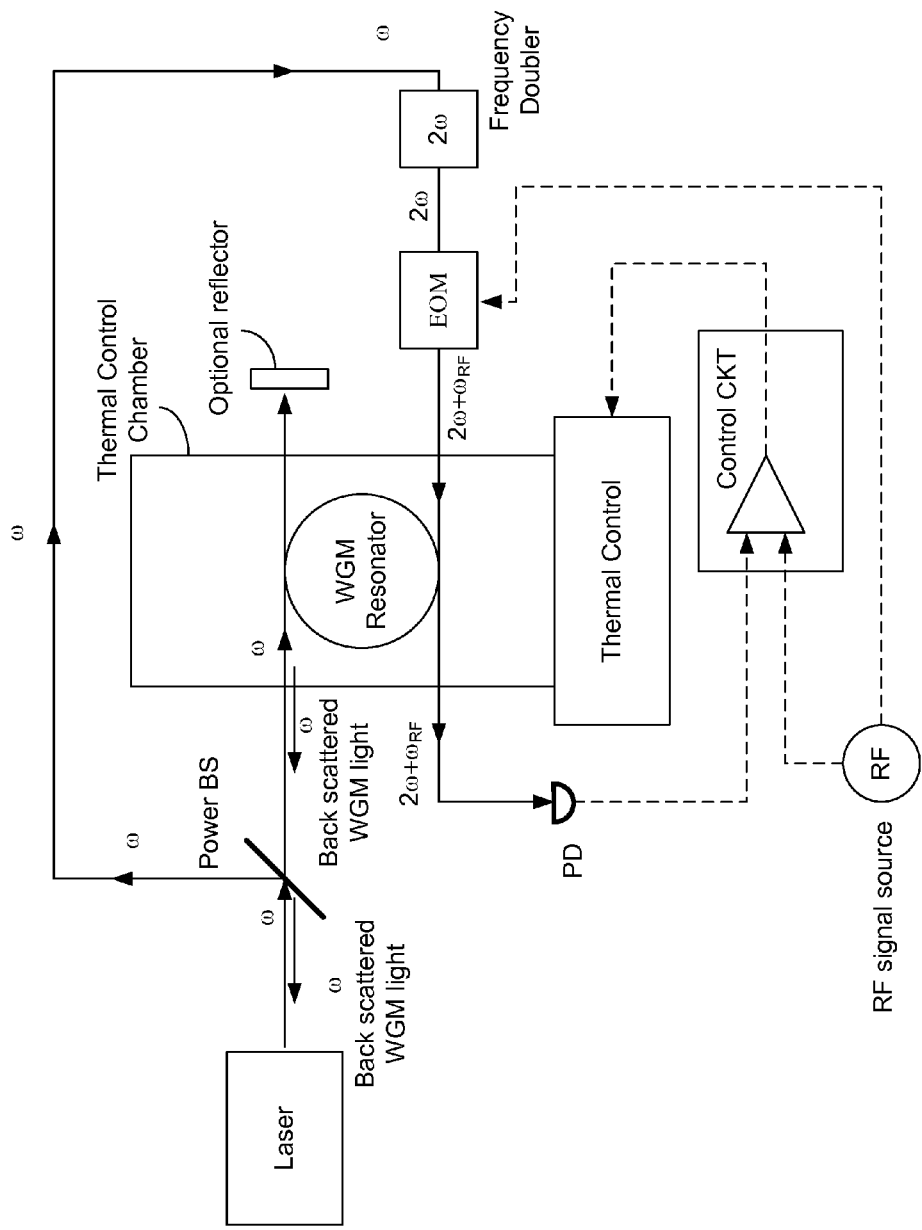

FIG. 13 shows a resonator stabilization system based on a frequency doubling technique. A tunable laser is injection locked to the WGM resonator as illustrated. The laser light from the laser is split into a path where a frequency doubler and an EOM produce a first laser beam and a second path where the original laser light is injected into the resonator and the light at the same frequency from the resonator is injected back to the laser to achieve injection locking. The second harmonic light is detected by a photodetector PD is mixed with an RF signal at an RF frequency that is used to drive the EOM.

This technique can be used for stabilization of the temperature inside the WGM channel for resonators made out of symmetric materials. Here modes with different polarizations and the same frequency have the same thermorefractive coefficient $\alpha_n$, but the coefficient itself is frequency dependent. Consider a WGM resonator interacting with bichromatic light having frequency $\omega$ and $\Delta\omega_{RF}+2\omega$. A laser with carrier frequency $\omega$ is locked to a mode. Then the second-harmonic light is produced by frequency doubling in a nonlinear crystal and it is subsequently frequency shifted with an acousto-optical modulator. The frequency shift $\Delta\omega_{RF}$ is locked to another WGM and is compared with a RF reference. The value of $\Delta\omega_{RF}$ fluctuates due to thermorefractive effect. The fluctuation is described by $$\Delta\tilde{\omega}_{RF1}=2\omega(\alpha_n(\omega)-\alpha_n(2\omega))\Delta T_m, \quad (C3)$$

and can be used for measurement of $T_m$. Because the relative accuracy of measurement of $\Delta\tilde{\omega}_{RF1}$ can easily reach the subhertz level, the relative frequency of the two WGMs separated by an octave can be stabilized better than one part per $10^{-14}$ per 1 s integration time.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations, enhancements and other implementations can be made based on what is described and illustrated in this document.

What is claimed is:

1. A method for stabilizing an optical resonator, comprising:
   providing an optical resonator that comprises a birefringent medium, and supports whispering gallery modes circulating in the birefringent medium;
   injecting a coherent optical beam that has polarization components in polarization directions of both ordinary and extraordinary polarization waves in whispering gallery modes, the coherent optical beam comprising a first optical component at a first optical frequency in resonance with the ordinary polarization wave and a second optical component at a second optical frequency in resonance with the extraordinary polarization wave;
   monitoring a change in a difference between the first optical frequency and the second optical frequency; and
   controlling the optical resonator to reduce the monitored change in the difference between the first optical frequency and the second optical frequency to stabilize the resonator resonance frequency of the optical resonator.

2. The method as in claim 1, wherein:
   the controlling the optical resonator to reduce the monitored change in the difference between the first optical frequency and the second optical frequency to stabilize the resonator resonance frequency of the optical resonator comprises controlling a temperature of the optical resonator.

3. The method as in claim 1, wherein:
   the controlling the optical resonator to reduce the monitored change in the difference between the first optical frequency and the second optical frequency to stabilize the resonator resonance frequency of the optical resonator comprises controlling a pressure exerted onto the optical resonator.

4. The method as in claim 1, wherein:
   the controlling the optical resonator to reduce the monitored change in the difference between the first optical frequency and the second optical frequency to stabilize the resonator resonance frequency of the optical resonator comprises controlling a control voltage applied to the optical resonator.

5. The method as in claim 1, wherein:
   the injected coherent optical beam is a laser beam from a single laser at one of the first optical frequency and the second optical frequency, and the laser beam is modulated at an RF frequency equal to a difference between the first optical frequency and the second optical frequency to have a sideband at the other one of the first optical frequency and the second optical frequency.

6. The method as in claim 1, wherein:
   the injected coherent optical beam is produced by combining a first laser beam from a first laser at the first optical frequency and a second laser beam from a second laser at the second optical frequency, where the first laser and the second laser are locked to each other in phase.

7. The method as in claim 1, comprising:
   comparing the difference between the first optical frequency and the second optical frequency to a clock signal to determine the change in the difference between the first optical frequency and the second optical frequency with respect to the clock signal.

8. A device, comprising:
   an optical resonator that comprises a birefringent medium, and supports whispering gallery modes circulating in the birefringent medium;
   an optical light source module that produces a coherent optical beam that comprises a first optical component at a first optical frequency and a second optical component at a second optical frequency different from the first optical frequency;
   an optical coupler that couples the coherent optical beam into the optical resonator to have polarization components in polarization directions of both ordinary and extraordinary polarization waves in whispering gallery modes in the optical resonator, wherein the first optical frequency is in resonance with the ordinary polarization wave and the second optical frequency is in resonance with the extraordinary polarization wave;
   a monitoring mechanism that monitors a change in a difference between the first optical frequency and the second optical frequency; and
   a resonator controller that controls the optical resonator to reduce the monitored change in the difference between the first optical frequency and the second optical frequency to stabilize the resonator resonance frequency of the optical resonator.

9. The device as in claim 8, wherein:
   the resonator controller controls a temperature of the optical resonator to reduce the monitored change in the difference between the first optical frequency and the second optical frequency to stabilize the resonator resonance frequency of the optical resonator.

10. The device as in claim 8, wherein:
    the resonator controller controls a pressure exerted onto the optical resonator to reduce the monitored change in the difference between the first optical frequency and the second optical frequency to stabilize the resonator resonance frequency of the optical resonator.

11. The device as in claim 8, wherein:
    the resonator controller controls a control voltage applied to the optical resonator to reduce the monitored change in the difference between the first optical frequency and the second optical frequency to stabilize the resonator resonance frequency of the optical resonator.

12. The device as in claim 8, wherein:
    the optical light source module comprises a single laser to produce a laser beam at one of the first optical frequency and the second optical frequency, and an optical modulator that modulates the laser beam at an RF frequency equal to a difference between the first optical frequency and the second optical frequency to have a sideband at the other one of the first optical frequency and the second optical frequency.

13. The device as in claim 8, wherein:

the optical light source module comprises a first laser that produces a first laser beam at the first optical frequency, a second laser that produces a second laser beam at the second optical frequency, wherein the first laser and the second laser are locked to each other in phase and the first and second laser beams are combined to produce the coherent optical beam that is coupled into the optical resonator by the optical coupler.

14. The device as in claim 8, wherein:

the resonator controller compares the difference between the first optical frequency and the second optical frequency to a clock signal to determine the change in the difference between the first optical frequency and the second optical frequency with respect to the clock signal.

* * * * *

UNITED STATES PATENT AND TRADEMARK OFFICE
CERTIFICATE OF CORRECTION

PATENT NO.      : 8,164,816 B1
APPLICATION NO. : 12/203143
DATED           : April 24, 2012
INVENTOR(S)     : Anatoliy Savchenkov et al.

It is certified that error appears in the above-identified patent and that said Letters Patent is hereby corrected as shown below:

On Title Page 2, in Item (56), in Column 1, under "OTHER PUBLICATIONS", Line 3, delete "Sympsoium" and insert -- Symposium --, therefor.

On Title Page 3, in Item (56), in Column 1, under "OTHER PUBLICATIONS", Lines 4-5, delete "Tecnhology," and insert -- Technology, --, therefor.

In Column 1, Line 51, delete "field" and insert -- field. --, therefor.

In Column 3, Table 1, Line 16, delete "specfic" and insert -- specific --, therefor.

In Column 5, Line 26, delete "$10^{-1}$." and insert -- $10^{-3}$. --, therefor.

In Column 12, Line 22, delete "This an" and insert -- This is an --, therefor.

In Column 14, Line 27, delete "evenascently" and insert -- evanescently --, therefor.

Signed and Sealed this
Eleventh Day of December, 2012

David J. Kappos
*Director of the United States Patent and Trademark Office*